United States Patent [19]

Lung et al.

[11] Patent Number: 5,355,449
[45] Date of Patent: Oct. 11, 1994

[54] METHOD AND APPARATUS FOR OUTLINE FONT CHARACTER GENERATION IN DOT MATRIX DEVICES

[75] Inventors: James C. Y. Lung; Gary Ruby; Jim C. K. Lo, all of San Jose, Calif.

[73] Assignee: Destiny Technology Corporation, Santa Clara, Calif.

[21] Appl. No.: 771,382

[22] Filed: Sep. 30, 1991

[51] Int. Cl.$^5$ ............................................. G06F 3/14
[52] U.S. Cl. ................................... 395/150; 345/143
[58] Field of Search ............... 395/150, 151, 149, 139; 340/730, 731; 345/143, 144; 382/22, 25

[56] References Cited

U.S. PATENT DOCUMENTS

| | | | |
|---|---|---|---|
| 4,745,575 | 5/1988 | Hawes | 364/900 |
| 4,855,935 | 8/1989 | Lien et al. | 395/142 |
| 4,937,761 | 6/1990 | Hassett | 395/150 |
| 5,068,803 | 11/1991 | Valdes et al. | 395/150 |
| 5,086,481 | 2/1992 | Yoshida et al. | 382/22 |
| 5,099,435 | 3/1992 | Collins et al. | 395/150 |
| 5,155,805 | 10/1992 | Kaasila | 395/151 |

OTHER PUBLICATIONS

Bresenham, "Algorithm for Computer Control of a Digital Plotter", IBM System Journal; vol. 4, No. 1, 1965.
Hersch, "Vertical Scan-Conversion for Filing Purposes", Proceedings Computer Graphics International, 1988.

*Primary Examiner*—Heather R. Herndon
*Assistant Examiner*—Michael Smith
*Attorney, Agent, or Firm*—Claude A. S. Hamrick

[57] ABSTRACT

Method and apparatus for outline font character generation in dot matrix devices including a point transform engine, a parametric equation generator, an adaptive forward differencing engine, a transition detection engine, a transition processor, an intermediate storage, and a bitmap converter. The point transform engine performs a linear transformation on the input control points to produce a set of control points corresponding to the description of the scaled image. The parametric equation generator computes a set of coefficients used in generating polysegments. The adaptive forward differencing engine generates a set of controlled length vectors representing the image, while the transition detection engine determines the transition pixels by scanning the vectors both horizontally and vertically to determine whether a scanline is crossed by the vector. The transition processor enhances the image quality and alters the number and location of the previously determined transition pixel. The transition locations for the image are accumulated in the intermediate storage until all curves of the image have been processed. The bitmap converter converts, on a line-by-line basis, the transition information into bitmap format.

17 Claims, 33 Drawing Sheets

Bézier Contour

Quadratic B-Spline Contour

Even-Odd Fill

Non Zero Winding Fill

Two Consecutive Cubic Bézier Curves

Point Transform Engine

Parametric Equation Generator

Transition Processor

Tile Test

Autobias without Stub Suppression

Autobias with Stub Suppression

Stub Test

Non Zero Winding Displacement

Left Bias Collision

Interior Filling Mode
Without Dropout Control (Y scan)
Interior Filling Mode
with Dropout Control Immediate (Toggle) Patch No Dropout Correction Dropout Correction with Toggle Patch Dropout Correction with Black Pixel Patch Autobias without Y Alignment Autobias with Y Alignment Transition Procession Flow Even Odd, Dropout Protected, Collision Handling Dropout Protected, Non Zero Transition Bitmap Converter Even Odd Converter Non Zero Winding Converter

METHOD AND APPARATUS FOR OUTLINE FONT CHARACTER GENERATION IN DOT MATRIX DEVICES

BACKGROUND OF THE INVENTION

1. Field of the Invention

This invention relates generally to methods and apparatus for converting electronically stored image data in outline form into a bitmap form which can be used to drive a dot matrix output device. More particularly, the present invention relates to an improved method and apparatus for converting input image data from a graphical/mathematical format to a display or print device format (i.e. a series of dots/pixels), wherein said method implements an outline font rendering process that provides scaling, scan-conversion, and shape filling of characters/graphics in spline outline formats. The method can be applied to a variety of font data input formats.

2. Description of the Prior Art

The outline font rendering process represents a large computational load and limits the performance of laser printer systems. More specifically, since the outline font rendering process must maintain typographic quality of an input font during font scaling and rotation as related to the limited resolution (typically 300 dots per inch) of a laser printer, a very slow printing rate/per page results.

A prior art outline font rendering process involves the following steps:

(1) Retrieving an outline font source data from a source of font character, wherein the character defines the outline of the source data with a set of curve and line control points.

(2) Transforming the source data in high precision to a set of control points (i.e., a transform image) related to a new coordinate system, wherein the same data is rotated and scaled accordingly.

(3) Correcting the transform image for misalignment by rounding its boundaries either up or down to the lowest quantized value of the new coordinate system. The output from this step is a corrected transformed image. Furthermore, the corrected transformed image is adjusted (according to the hints included with the curves and lines of the source data) to eliminate image distortions due to grid correction.

(4) Scan-converting the corrected transform image to a sequence of points occurring at periodic intervals along the outline of the image. This sequence of points is an image outline.

(5) Selectively filling the image outline with points to provide a solid representation of the image in bitmap form.

(6) Processing the resulting filled outline of the image by a raster operator, which produces a stream of data.

An outline font source data is made up of a set of control points of curves and lines which serve to define the outline of the source data. Referring now to FIG. 1 which illustrates the composition of the outline font source data of a small letter "a" the figure is shown on a pixel grid blown up many times normal size in order to see the details of the original curves 10 and the short vector approximation to the curves 20. The arrows 30 show the order in which the curves are processed.

FIG. 2 shows an enlarged simple curve composed of straight lines and cubic Bezier curves. A straight line segment may be defined by two points: a start point 40 and an end point 42. A cubic Bezier curve is defined by four points: a start point 42, a first control point 44, a second control point 46, and an end point 48. The start and end points always lie on the curve.

FIG. 3 shows the same curve as FIG. 2 but rendered as quadratic B-Spline curves and straight lines. As before, straight lines are defined by a begin point 50 and an end point 52, both of which lie on the line. A quadratic B-Spline curve is defined by three control points but the control points come in two weights. Off-curve control points have a weight of "one", while on-curve control points have a weight of "two". The weight indicates how many times the point is used in developing curves of the contour. The first curve after the line segment is defined by the on-curve point at the end of the line segment 52 and the off-curve control point 54 so the three points that define the first curve are 52, 52, 54. The second curve is defined by the points 52, 54, 56, and the third curve is defined by 54, 56, 56. The process can be visualized as making a list of the control points with on-curve entries repeated, then taking groups of three entries to define a curve as follows: (Note that each vertical row of X's represents one defined curve.)

| 52 | (on)  | X | | | | | |
|----|-------|---|---|---|---|---|---|
| 52 | (on)  | X | X | | | | |
| 54 | (off) | X | X | X | | | |
| 56 | (on)  |   | X | X | X | | |
| 56 | (on)  |   |   | X | X | X | |
| 58 | (off) |   |   |   | X | X | X |
| 59 | (on)  |   |   |   |   | X | X |
| 59 | (on)  |   |   |   |   |   | X |

One problem in prior art devices is the transfer of redundant control point data. As discussed earlier, an outline font is made up of a set of curves or lines wherein each curve or line is made up of control points. When a curve of the outline font is processed all the control points associated with that curve must be transferred to the processing device. In many cases a control point is applicable to two curves, thus redundant data transfer occurs.

Scan-conversion is the process of selecting the pattern of device pixel dots which match the mathematical representation of the image outline to be displayed. FIG. 4 demonstrates one method of defining a set of transition points based on a pixel centered scan line 60. A transition is defined as a change of state along the scan line. That is, when a scan line crosses the outline of the character the "insidedness" of a point on the scan line changes going from outside to inside or inside to outside. Thus a transition is created each time one of the short vectors crosses the vertical centerline of a pixel for horizontal scanning.

The final placement of the transition is a function of first the pixel level rules for placement (e.g., transition detection with offset) and secondarily the character level rules (e.g., rules dealing with multiple transitions in a single pixel and handling image enhancement). FIG. 4 illustrates an example of a pixel level rule of transition detection and placement, the so-called 50—50 rule. If the point of intercept 62 with the horizontal scan line 60 placed at the vertical middle of the pixel occurs to the left of the horizontal center then the transition 64 will be assigned to the pixel in which the crossing took place. If the point of intercept 66 crosses on or to the right of the pixel center the transition 68 will be assigned to the pixel to the right of that which contains the intercept.

Most of the prior art devices and methods adapt the Bresenham algorithm for the scan-conversion process. Bresenham algorithms are described in the articles: (1) "Algorithm for Computer Control of a Digital Plotter," *IBM System Journal* Vol. 4, No. 1, 1965, by J. E. Bresenham, (2) "A Linear Algorithm for Incremental Digital Display of Circular Arcs," *Communication of the ACM*, February, 1977, p. 100–106, by J. E. Bresenham.

A problem with the prior art methods of scan conversion is that an independent and unique scan conversion method must be used for the different formats chosen by different typographic designers to store their type designs. That is, a different scan converter method must be used for vectors, arcs, Beziers, and B-spline. It is much more desirable for a commercial product to use one general set of scan-conversion and filling methods that can handle the various available font standards, rather than to use several independent methods for different formats.

Filling is the process of turning on device pixel dots which fall within the interior area bounded by the outline pixel dots generated from the scan-conversion process. There are two major filling algorithms found in the prior art: Even-Odd parity fill and Non-Zero Winding fill. FIG. 5 illustrates the even-odd parity fill algorithm along with the 50—50 transition detection rules.

Starting at the far left a value of "0" (outside or white) is assumed and maintained until the first transition 90 is encountered. At this point a value of "1" (inside or black) is assigned and maintained until the next transition 74 is encountered. The run of "1"s between "0"s is a horizontal span or fill for the character, in this case running from the first transition 70 to one before the second transition 74. The Even-Odd parity fill algorithm assumes that the character being processed contains no overlapping contours which were supposed to receive solid fill.

An alternate filling algorithm is "Non-Zero Winding". This method assigns a value to each transition based on the sign of the Y component of the segment which created it. That is, a "+1" is assigned if the segment is horizontal or rises going from the segment's starting point to its endpoint, a "−1" is assigned if the segment is going down. If no transition occurs at a point it is considered "0". To create the filled character the line is scanned from left to right starting with a value of zero and a sum is kept of the assigned transition values. A "1" (inside or black) is assigned to each point on the scan line where the sum is not zero. Thus, returning to FIG. 4, the first transition 68 would be assigned −1 because its segment is going down along the path being traced. The second transition 64 is assigned a +1 because its segment is going up. When the filling process is applied, returning to FIG. 5, the sum starts at "0" so the fill is left at zero until the first transition. The first transition has a value of −1, thus the sum is −1 (non zero) and the fill is set to "1". The next transition is assigned +1 so the sum is "0" and the fill is set to "0". For this case the result is identical to the result of the Even-Odd filling.

Referring now to FIG. 6 which illustrates a shortcoming of the Even-Odd parity fill algorithm, the figure depicts two overlapping contours, a horizontal rectangle 76, and a vertical rectangle 78 crossed to form a "+" character. When the character is filled with the Even-Odd parity fill algorithm, it is left with a hole in the center of the character. FIG. 7 depicts the same character filled using the Non-Zero Winding fill algorithm. The direction of tracing both the horizontal 90 and the vertical 91 contour is marked by arrows 92. A scan line 93 passing through the area of interest encounters a first transition 94 assigned with a −1, the second transition 95 is also assigned a −1, the third transition 96 is assigned +1, and the fourth 97 is assigned +1. The sum at the first transition is −1, at the second is −2, at the third is −1 and at the fourth is 0, thus between the first and fourth transition positions the fill is "1" continuously.

Hawes (U.S. Pat. No. 4,745,575) discloses a technique to accomplish area filling using hardware. A microprocessor performs the Bresenham algorithm of scan-conversion. Polysegments generated by the scan-conversion microprocessor are then fed to a hardware filling module. Hawes uses a single auxiliary memory to store the outline of a polygon area, and the Filling Starting Point and Filling Ending Point information for all the horizontal filling spans involved in the scan-converted polygons. Since the design is based on the integer Bresenham algorithm, it suffers a quality problem when it is applied to render outline fonts.

A scientific paper entitled "Vertical Scan-Conversion for Filing Purposes" by R. D. Hersch (*Proceeding Computer Graphics International* 88, Geneva, Springer Verlag, 1988), reports on studies of scan-conversion methods and describes a method for solving the incompatibility issue of scan-conversion and filling approaches. Splines are subdivided into variable lengths of polysegments which can have non-integer vertices. From intersections between the polysegments and scan lines, the algorithm determines two transition pixels for each horizontal span as the beginning and ending indicators. Each transition pixel indicates a color change, from black to white, or vice versa. Between the two transition pixels are interior pixels which are filled by applying a "parity scan line fill method." In order to calculate the intersection and locate the transition pixels, a time-consuming geometrical computation is performed. The higher the resolution, the more calculations are involved. Since the method uses the Even-Odd parity filling algorithm, the problem dealing with overlapping contours (discussed earlier) OCCURS.

Lien (U.S. Pat. No. 4,855,935) discloses a technique to scan-convert curves and vectors by the hardware implementation of Adaptive Forward Difference (AFD) algorithm. Lien adapts the Forward Difference parameter increment so as to advance along the curve with a step size which is approximately equal to the distance between two adjacent pixels. This method is called "Adaptive Forward Difference (AFD)." Thus, in the Lien apparatus, curves and curved surfaces are rendered by AFD and vectors are rendered by Bresenham algorithm using many of the same circuit components utilized by AFD. Since the AFD algorithm does not require the high speed stack memory, it is more suitable for being implemented in the hardware apparatus. Hassett (U.S. Pat. No. 4,937,761) discloses a technique for rendering outline fonts using hardware. In the Hassett device, a line or curve is scan-converted ("discrete point conversion" in Hassett's terminology) to polysegments. Then the polysegments are further transformed to the coordinate resolution of the target marking engine. Scaling up or down operations may be applied to the polysegments during the "transforming" process. Hassett also uses a dithering technique to smooth the polysegments which are further scan-converted during the "transforming" step. The final scan-converted and dithered polysegments are separated as a dithered image outline shape and a map of interior pixels to be filled, which are then combined for receipt by the raster operator. Two separated memories are required to store the outline points and filling starting point/filling ending points. The final bitmap image is provided by combining the outline image and the filled image resulting from parity filling all the starting points/ending points. Since the object outline is generated by the conventional scan-conversion algorithm (the Bresenham algorithm is used), the dithering technique is used, instead of "hinting", to improve the bitmap image quality in Hassett's approach.

Another problem with the prior art method of hinting is that it is based at the character level. Character level hints require intensive processing which must be performed before any other image processing can be accomplished. Thus, hinting at the character level decreases the throughput of an outline font rendering system.

Still another problem with prior art devices is that the entire image is converted to bitmap format. This increases the memory requirements and decreases the throughput of these prior art font rendering systems.

SUMMARY OF THE PRESENT INVENTION

It is an object of the present invention to provide an apparatus and method to increase the throughput for an outline font rendering system.

Another object of the present invention is to provide an apparatus and method capable of accepting a multitude of character coding input forms to an outline font rendering system.

Yet another object of the present invention to provide an apparatus and method to enhance the output image quality for an outline font rendering system.

Briefly, a preferred embodiment of the present invention includes a point transform engine for generating a scaled image and for retaining any control points applicable to subsequent processing, a parametric equation generator for computing a set of coefficients used in polysegment generation processing, an adaptive forward differencing engine for generating a set of uniform length vectors representing the image, a transition detection engine for determining the transition pixels by scanning the vectors both horizontally and vertically and determining whether a scanline is crossed by the vector, a transition processor for enhancing the image quality by altering the number and location of the previously determined transition pixel, an intermediate storage for accumulating the transition locations for the image until all curves for the image have been processed, and a bitmap converter for converting the transition information into bitmap format on a line-by-line basis.

An advantage of the present invention is to retain any control point data that is required to process subsequent curves or lines thereby reducing the amount of data transfer into point transform engine and thereby increasing the throughput of an outline font rendering system.

Another advantage of the present invention is to convert the stored transition data into the bitmap format on a line-by-line basis thereby increasing the throughput of an outline font rendering system.

Still another advantage of the present invention is to perform enhancement techniques at the pixel level hinting thereby increasing the throughput and the output quality of an outline font rendering system.

Yet another advantage of the present invention is to generate polysegments for characters coded in a plurality of distinct coding formats thereby increasing the throughput of an outline font rendering system.

Still another advantage of the present invention is to perform enhancement techniques for both vertical and horizontal scan detection thereby increasing the output quality of an outline font rendering system.

These and other objects and advantages of the present invention will no doubt become apparent to those skilled in the art after having read the following detailed description of the preferred embodiment illustrated in the several figures of the drawing.

IN THE DRAWING

DESCRIPTION OF THE PREFERRED EMBODIMENT

Figure 1:
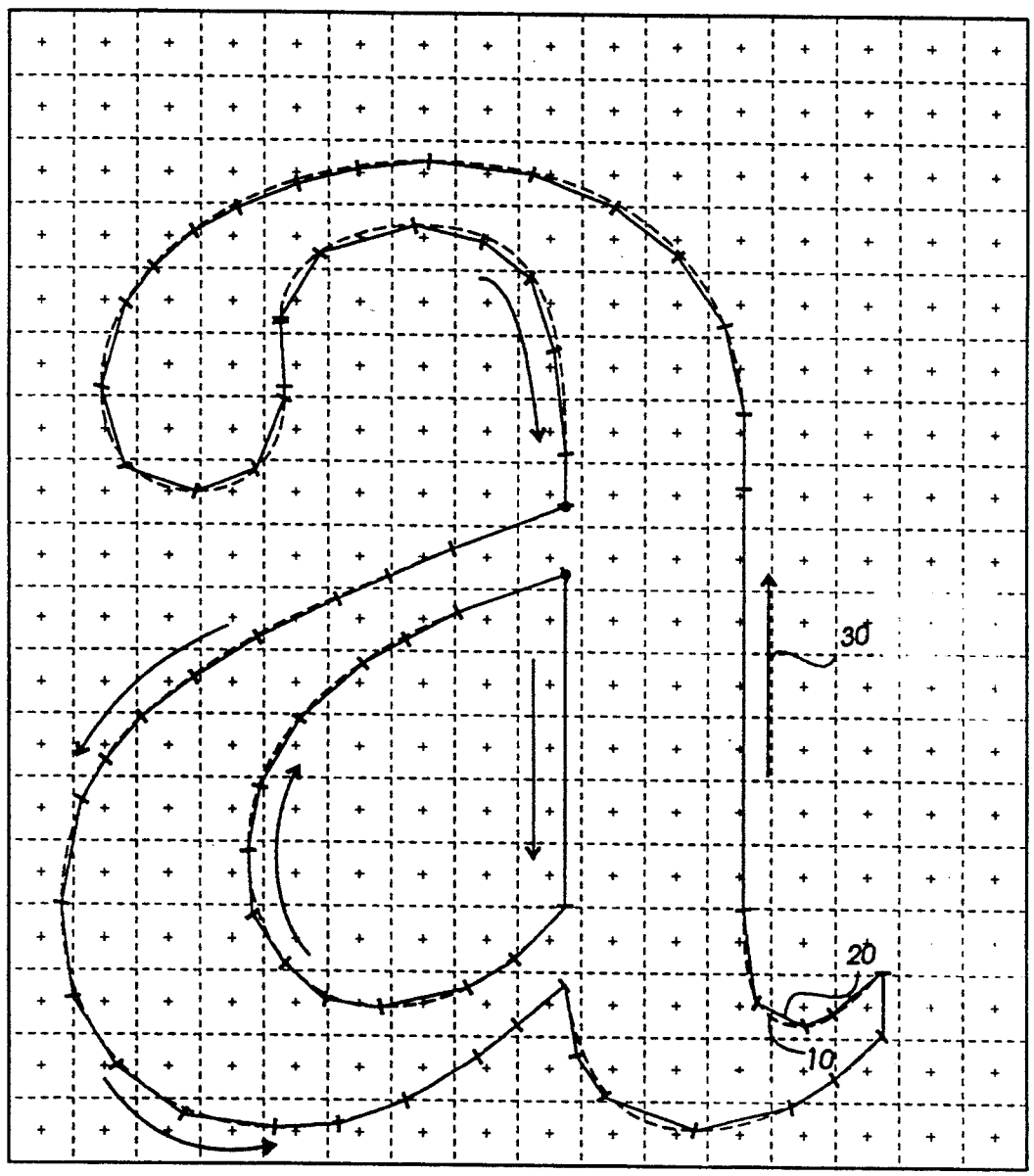
FIG. 1 depicts a prior art rendering of a character into straight and curve segments.
Figure 2:
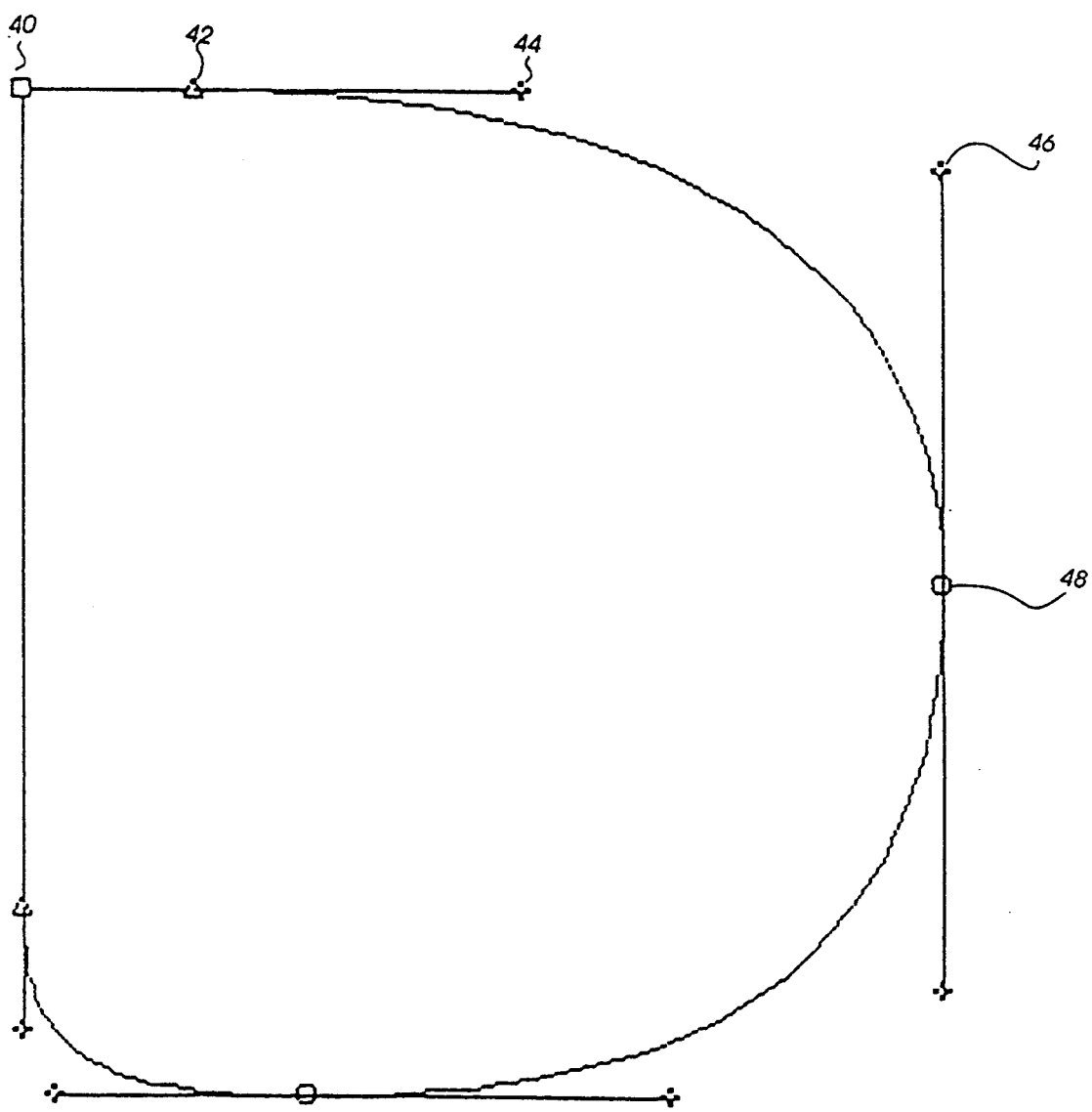
FIG. 2 depicts a prior art representation of a Bezier contour.
Figure 3:
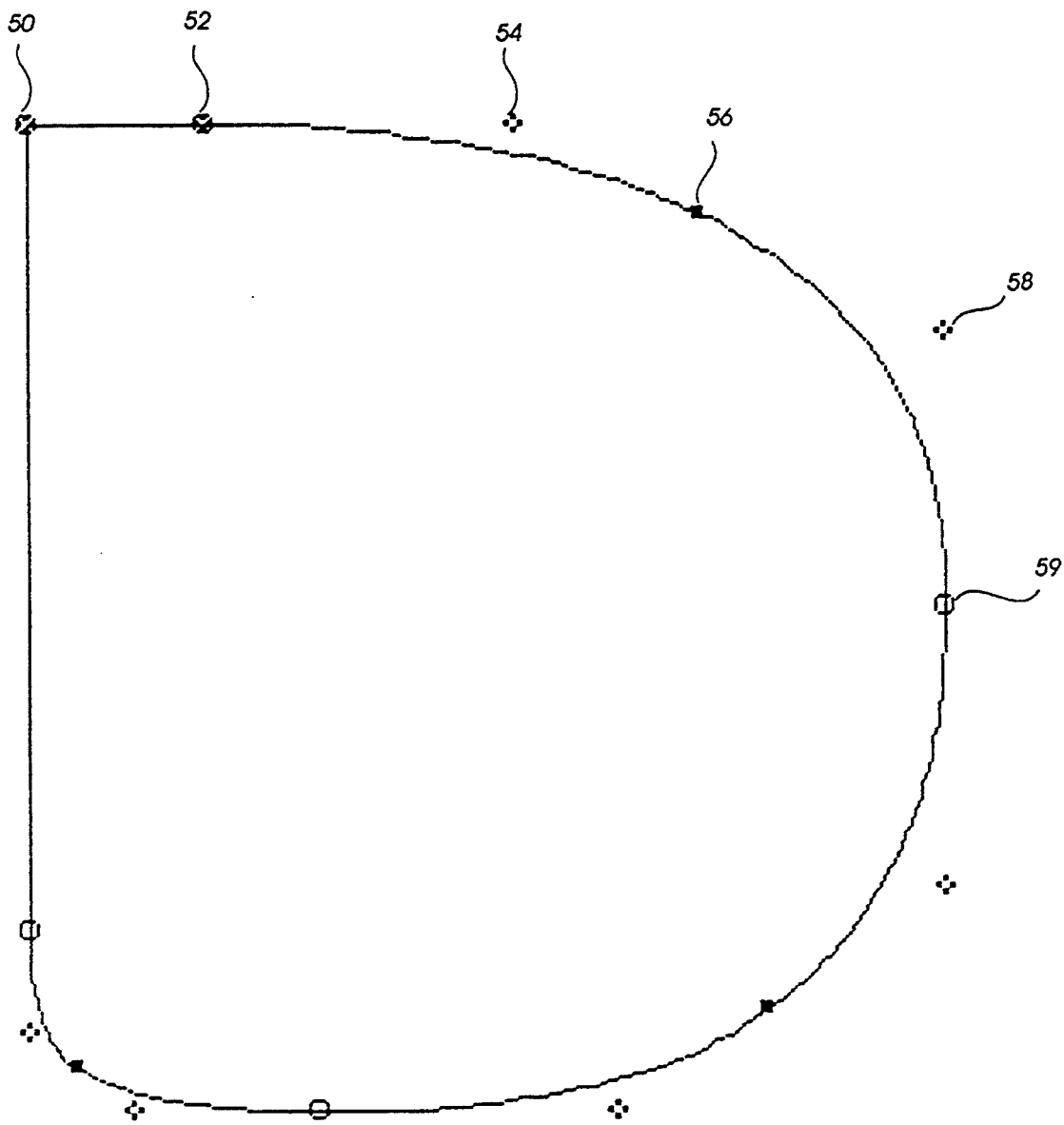
FIG. 3 illustrates a prior art representation of a Quadratic B-Spline contour.
Figure 4:
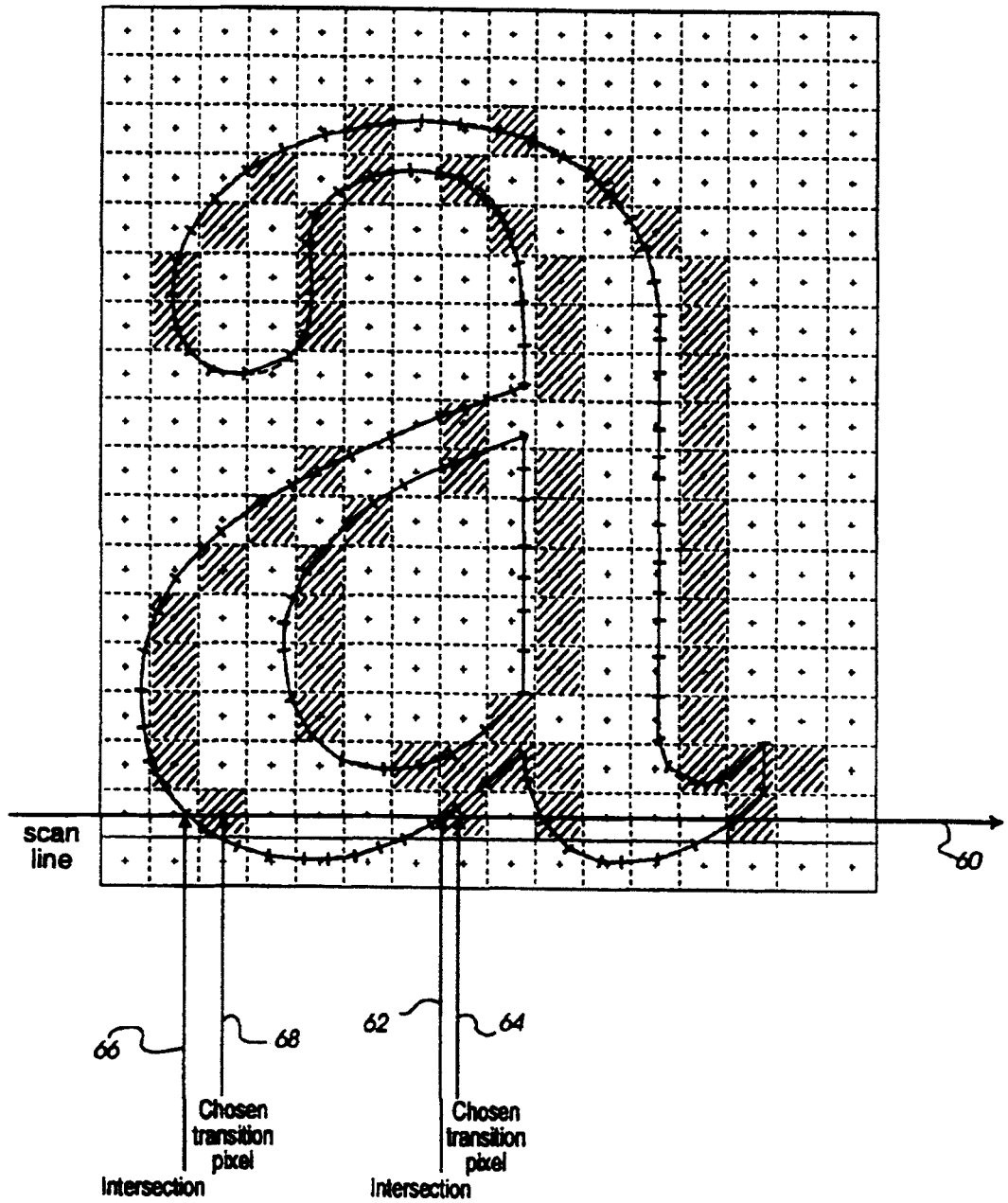
FIG. 4 shows a prior art method for detection of transition pixels.
Figure 5:
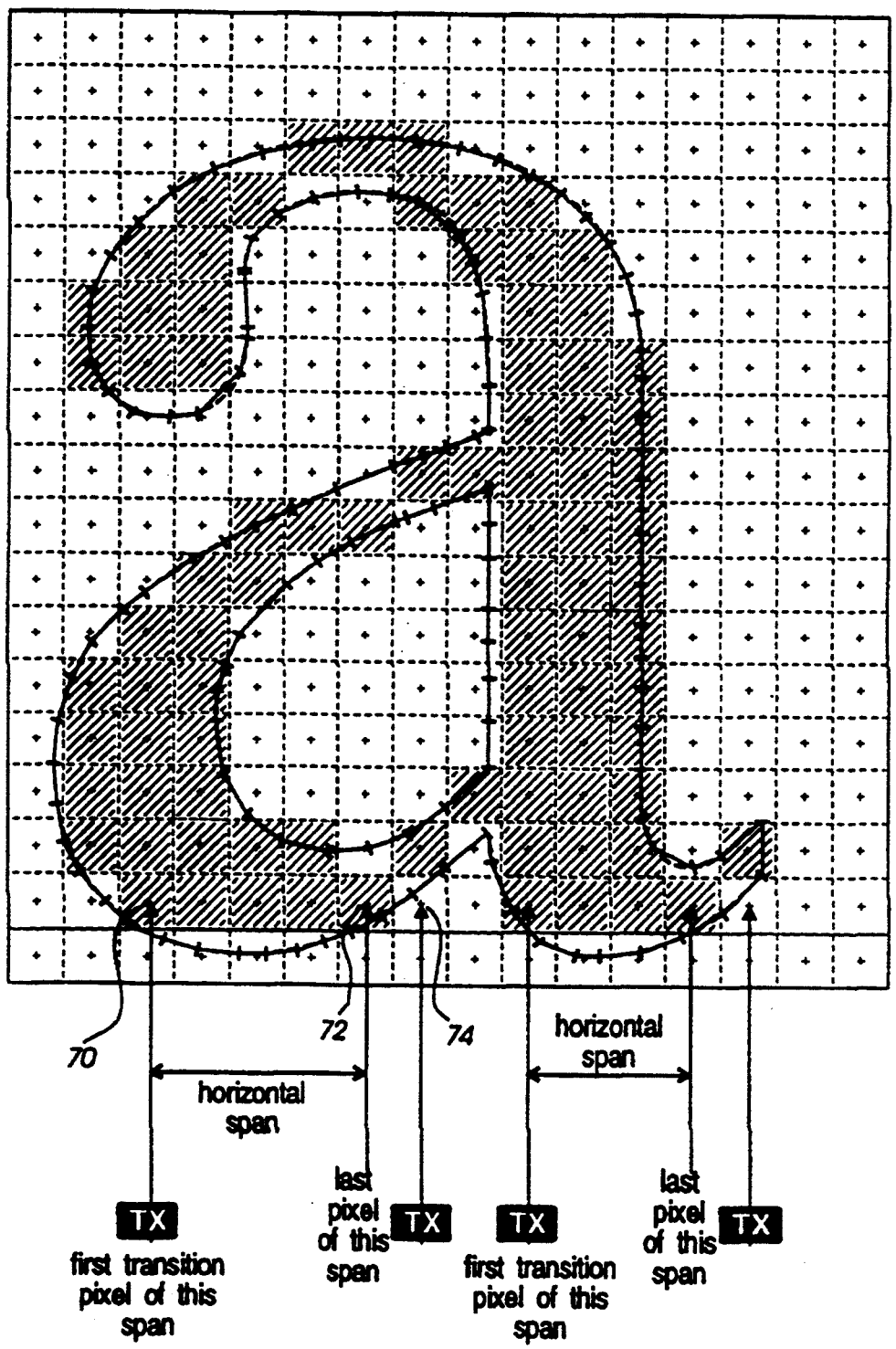
FIG. 5 illustrates a prior art method of the Even-Odd parity fill algorithm.
Figure 6:
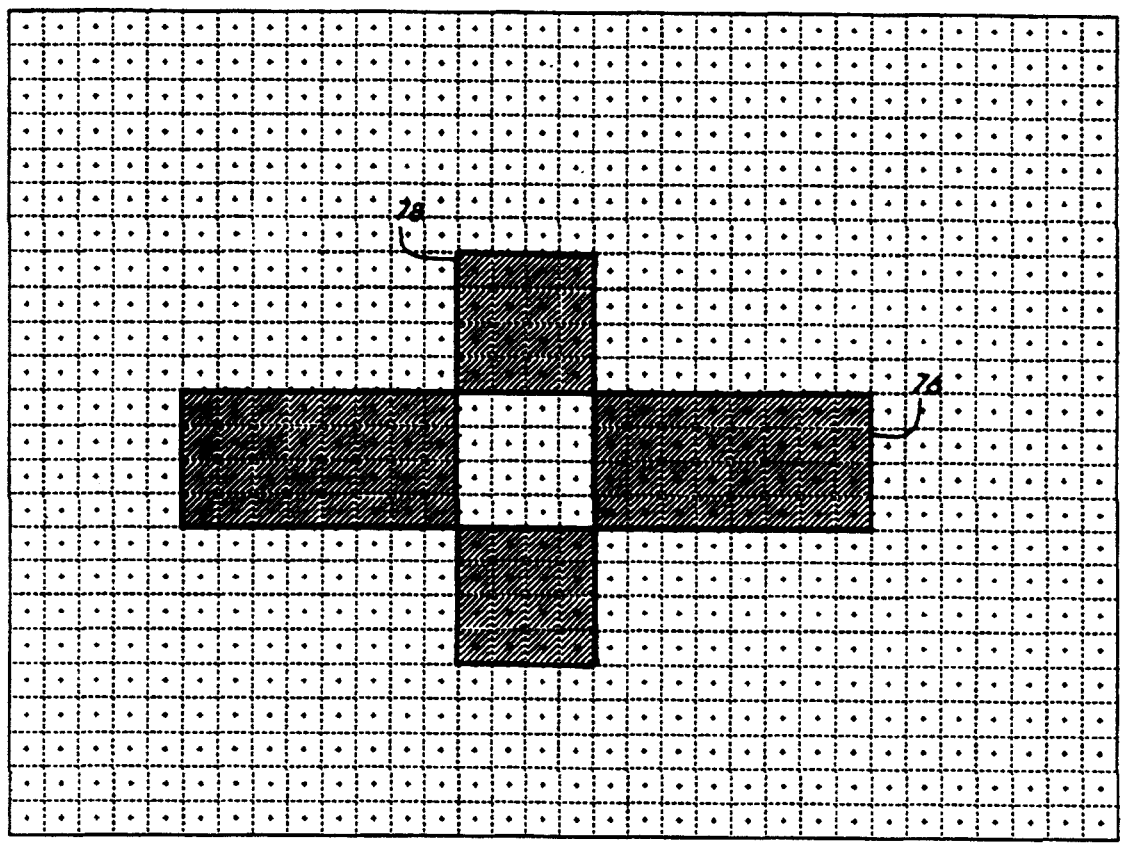
FIG. 6 illustrates the shortcomings in the prior art Even-Odd parity fill algorithm.
Figure 7:
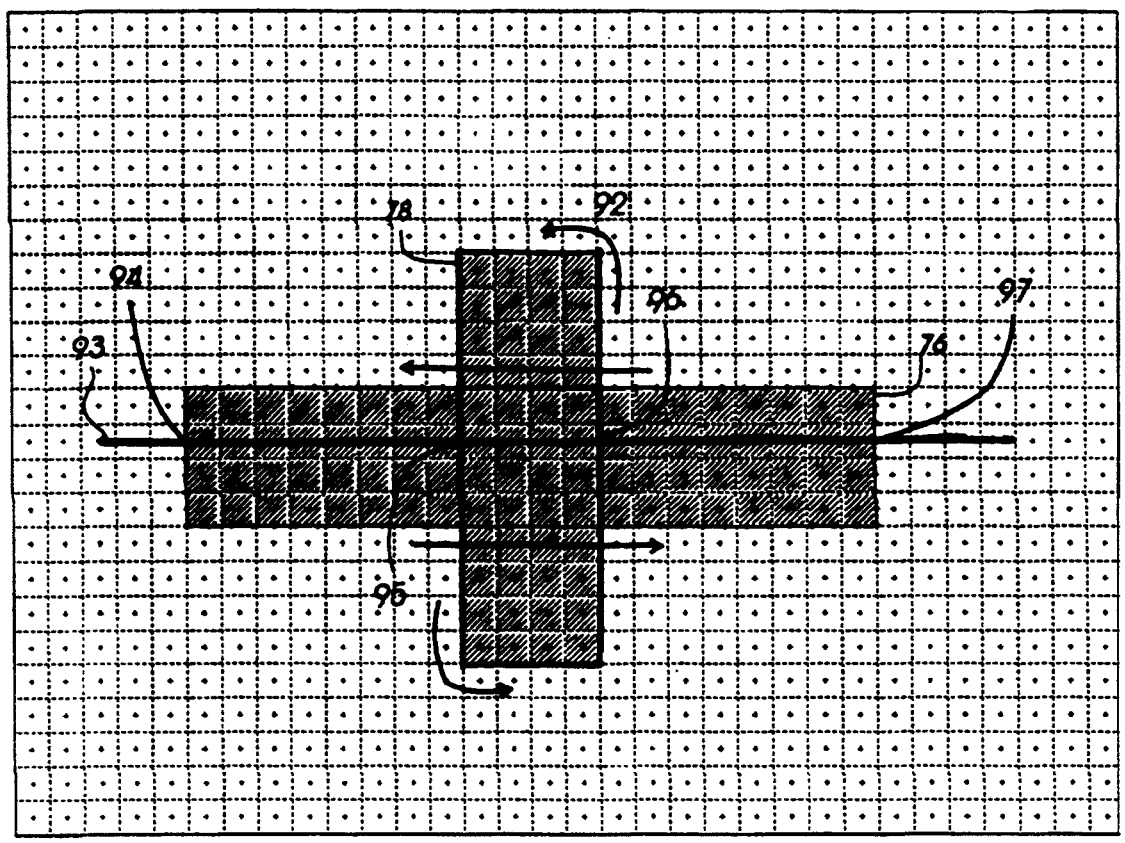
FIG. 7 shows a prior art Non-Zero Winding fill algorithm.
Figure 8:
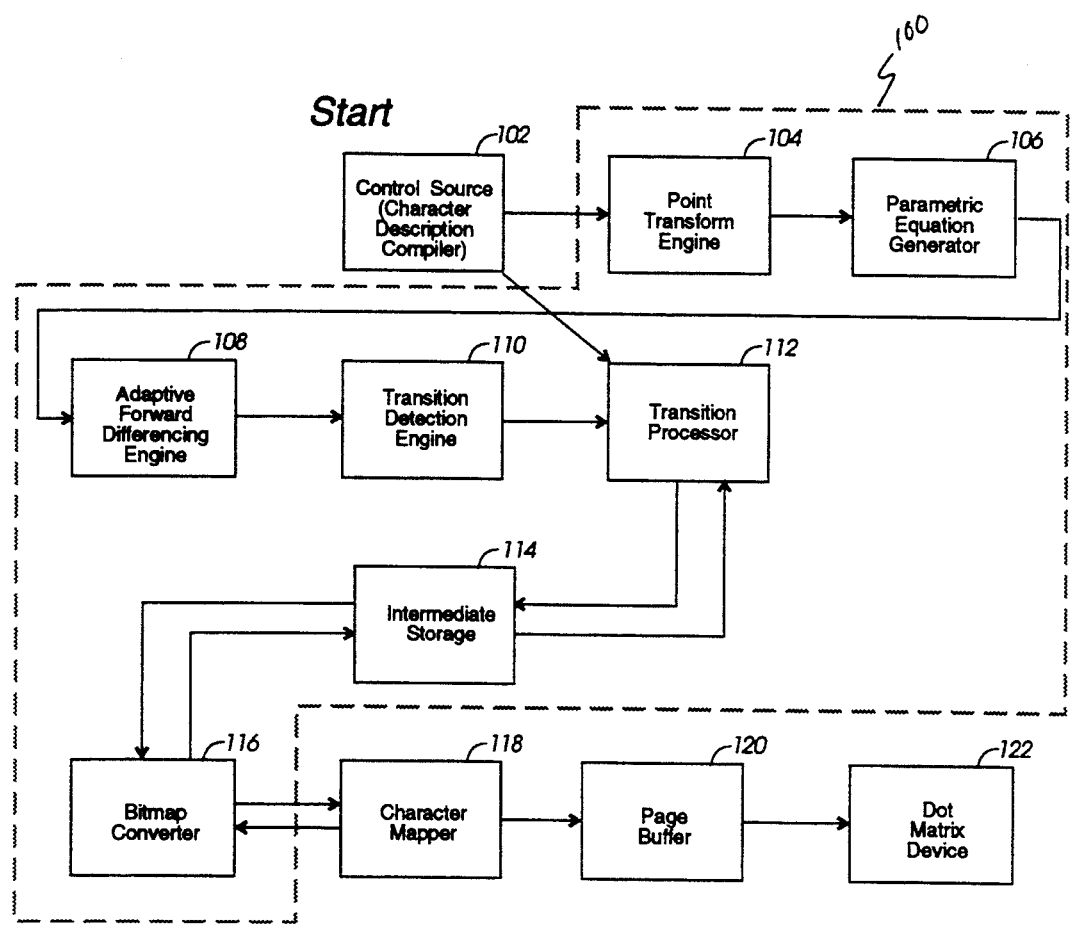
FIG. 8 is a block diagram illustrating the principal functional components of a preferred embodiment of the present invention.

A block diagram showing the basic functional components of a preferred embodiment of the present invention is illustrated at 100 in FIG. 8. The process starts with a control source 102 which operates on a character description to produce a control point stream for character rendering as well as selecting the options for character conversion. The character, as represented by the control point stream, is operated on by a point transform engine 104 to generate a sized, rotated and/or skewed image to an appropriate scale. A parametric equation generator 106 converts the rotated image or scaled curve into a set of coefficients used to initialize an adaptive forward differencing engine 108. The adaptive forward differencing engine 108 approximates the image by a set of short vectors. Each vector is constrained to be less than one pixel width in both X or Y direction to satisfy the conditions of a transition detection engine 110. The transition detection engine 110 operates on each short vector to determine whether a transition pixel exists when the vector is scanned horizontally or vertically. The engine 110 also detects a vertical and horizontal tracing direction, determines whether the vector passes through a pixel's center, and whether either the X or Y component of the vector is zero. The output of engine 110 is the transition pixel's address, whether the address for writing the transition should be displaced to the right, and a set of flags indicating details of the transition pixel.

The transition processor 112 accesses the intermediate storage 114 at the address of the proposed transition received from the transition detection engine 110. If there is already a transition stored at that location, a means of selecting the proper transition is performed. When a decision has been reached, the address of the selected transition pixel is output to intermediate storage 114 where character image information accumulates until all curves for the character have been processed. When all curves of a character have been processed, a character mapper 118 may direct a bitmap converter 116 to start reading the bitmap converter scan line.

The scanline bitmap information is passed by the character mapper 118 into a page buffer 120 where multiple characters are accumulated to be sent to a dot matrix device 122.

The functions in blocks 102 to 114 operate in parallel on curve data to produce the data for intermediate storage. When the pipeline has finished processing the last curve of the character, the bitmap conversion process starts as a second operation comprising blocks 114,116,118, and 120. This second operation is not concurrent with the pipelined processing of the curves.

The point transform engine 104 provides a linear transformation of each control vector represented as an [X,Y] coordinate pair and provides control point inheritance as applicable. Control point inheritance logic eliminates redundant transfer of control point data on the part of the control source 102. This logic holds and/or computes data from the last curve pertinent to the next curve. For example, in a Bezier curve the only information to be carried to the next curve is the absolute end address which is used as the starting address of the next curve. Thus, for Bezier curves the intermediate relative control point values are summed to produce the beginning point of the next curve and the intermediate points are cleared in preparation for the next curve.

For B-Spline curves each new control point can produce a new subcurve after the initial control points have been written. The control source 102 takes care of interpreting on-curve points as two consecutive control points and for cubic B-spline curves treats line segment endpoints as three consecutive control points.

Figure 9:
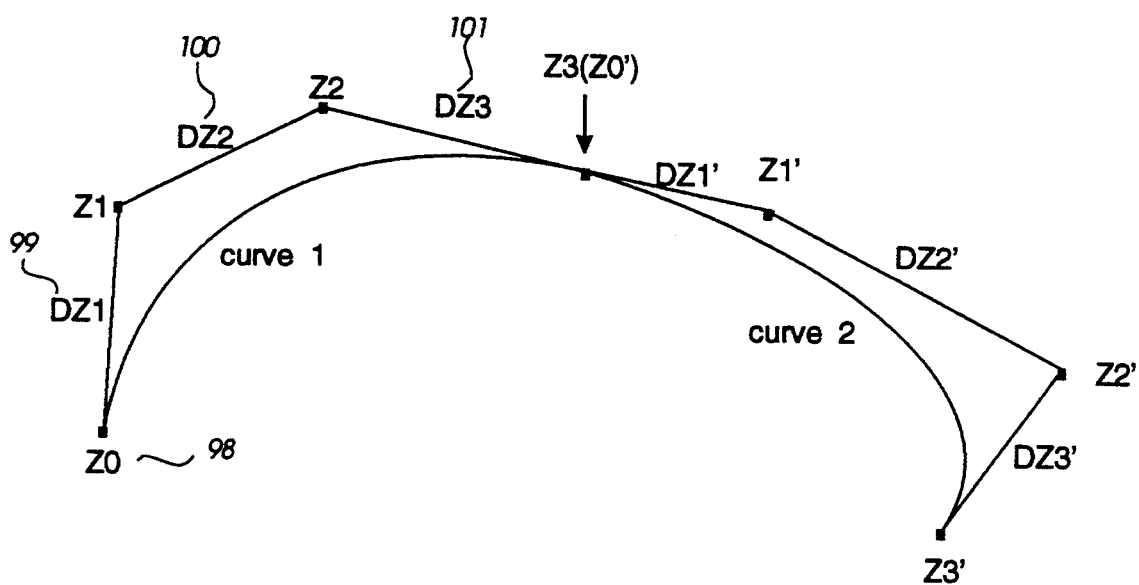
FIG. 9 depicts the characteristic points required for utilizing the inheritance logic of the present invention.

Referring now to FIG. 9, when processing a cubic curve, four control points are needed to define a curve, a Z0[X,Y] 98 (absolute begin point), a DZ1[X,Y] 99 (first relative control point), a DZ2[X,Y] 100 (second relative control point) and a DZ3[X,Y] 101 (final relative control point). After the first curve is written the inheritance logic calculates a Z0 for the next curve as follows:

Z0' = Z0 + DZ1 + DZ2 + DZ3

Similarly for a quadratic B-Spline where only three control points are needed, the inheritance logic performs as follows:

Z0' = Z0 + DZ1
DZ1' = DZ2
DZ2' = 0
DZ3' = 0

In addition to these techniques the concept of triggered execution has been added to again decrease bandwidth requirements on the control source 102 bus. That is, instead of loading the control points and then initiating activity with a start curve command, the loading of a certain parameter for each curve type triggers the start of processing. The curve type is loaded before curves are processed and need not be reloaded for subsequent curves of the same type. The trigger point for the curve types is as follows:

Line or Vector: DZ1[Y]
Quadratic (Bezier or B-Spline) DZ2[Y]
Cubic (Bezier or B-Spline) DZ3[Y]

In the worst case, where the curve type changes on every curve, it requires no more bandpass than the approach with a "Curve Start" command for every curve.

Figure 10:
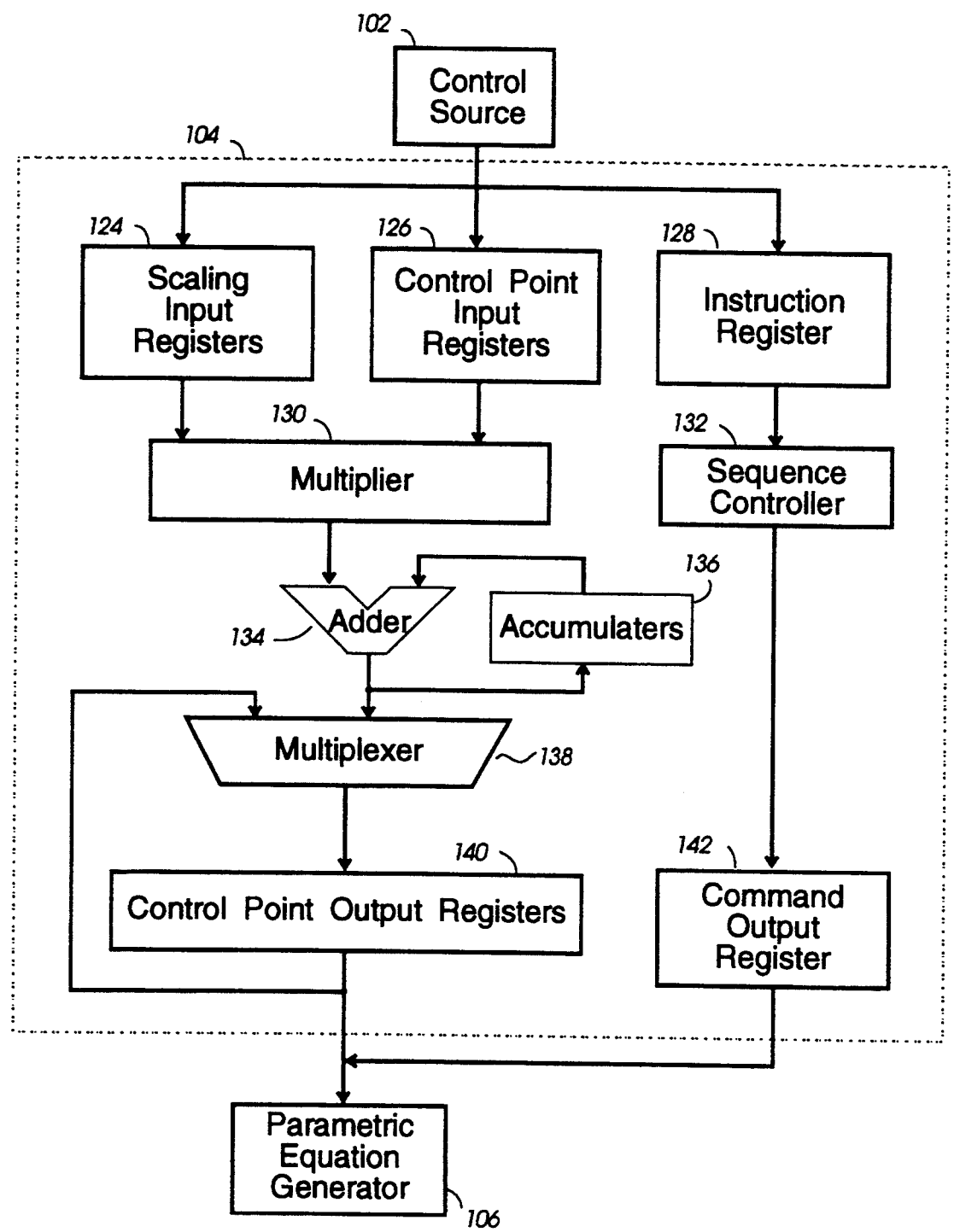
FIG. 10 is a block diagram illustrating the principal functional components of the point transform engine.

Referring now to FIG. 10, in the point transform engine 104 instructions are received by an instruction register 128, scaling factors are received by a set of four scaling input registers 124, and a set of coordinate pairs of the control vector are received by a set of eight control point input registers 126. The four Scaling Registers are specified as ScA (Scale factor A), ScB, ScC, ScD as used in the transformation formula:

Px' = ScA*Px + ScC*Py
Py' = ScB*Px + ScD*Py

The eight Control Point input registers are specified as coordinate pairs:

[P0x,P0y] (the x and y component of point Z0),
[DP1x,DP1y] (the relative vector from P0 to P1),
[DP2x,DP2y] (the relative vector from P1 to P2),
[DP3x,DP3y] (the relative vector from P2 to P3).

There are three accumulator registers 136 specified as:
AccTemp; used as storage for intermediate data.
AccP3x; used to calculate the x coordinate of the curve endpoint
AccP3y; used to calculate the y coordinate of the curve endpoint.

The arithmetic operations performed in the transformation process are handled by a two input adder 134 and a multiplier 130. The multiplier 130 takes one scale factor and one control point coordinate selected by the sequencer and produces a signed product which is fed into the adder 134. The second input to the Adder is one of 4 values from the accumulators 136 (i.e., one of the three accumulator registers or zero). The adder's 134 output goes to the accumulators 136, which are selectably loadable, and to a plurality of control point output registers 140 by way of an output multiplexer 138. The output multiplexer 138 selects either the sum from the adder 134 or an inheritance value as input to the selectably loadable control point output registers 140. The preferred implementation for the multiplier 130 is as a combinatorial logic design and for the adder 134 is as a carry-look-ahead design.

The eight control point output registers 140 are specified as:

P0′=[P0x′,P0y′]; transformed P0,
DP1′=[DP1x′,DP1y′]; transformed DP1,
DP2′=[DP2x′,DP2y′]; transformed DP2, and
DP3′=[DP3x′,DP3y′]; transformed DP3.

The instruction register 128 is read by a sequence controller 132 which also monitors the loading of the other input registers to determine how to process the incoming data. All processing in the point transform engine 104 is conducted under the direction of the sequence controller 132, which is a sequential state machine.

A pseudocode example of the transformation of a quadratic Bezier curve, as the first curve of a contour, is as follows:

AccTemp gets ScA*P0x+0
P0x′ and AccP3x get ScC*P0y+AccTemp
AccTemp gets ScB*P0x+0
P0y′ and AccP3y get ScD*P0y+AccTemp (thus P0′ is stored and AccP3=P0′)
AccTemp gets ScA*DP1x+0
AccP3x gets ScA*DP1x+AccP3x
DP1x′ gets ScC*DP1y+AccTemp
AccP3x gets ScC*DP1y+AccP3x
AccTemp gets ScB*DP1x+0
AccP3y gets ScB*DP1x+AccP3y
DP1y′ gets ScD*DP1y+AccTemp
AccP3y gets ScD*DP1y+AccP3y (Thus DP1′ is stored and AccP3=P0+DP1.)
AccTemp gets ScA*DP2x+0
AccP3x gets ScA*dP2x+AccP3x
DP2x′ gets ScC*DP2y+AccTemp
AccP3x gets ScC*DP2y+AccP3x
AccTemp gets ScB*DP2x+0
AccP3y gets ScB*DP2x+AccP3y
DP2y′ gets ScD*DP2y+AccTemp
AccP3y gets ScD*DP2y+AccP3y (Thus DP2′ is stored and AccP3=P0+DP1+DP2=P2 the endpoint of the curve and beginning of the next curve.)

The command output register 142 is loaded by the sequence controller with curve type information on a per curve basis and an "End of Character" flag on a once per character or tile basis.

The parametric equation generator 106 processes the transformed control point information, along with curve type, into a set of initialization parameters for the adaptive forward differencing engine 108. The mathematical expressions for the coordinate of a curve segment are:

$X = f_1(t) = a_1 * t^3 + b_1 * t^2 + c_1 * t + d_1$
$Y = f_2(t) = a_2 * t^3 + b_2 * t^2 + c_2 * t + d_2$ where t ranges from 0 to 1 to produce a curve segment. The outputs from the parametric equation generator engine 106 are the starting point of the curve (D0) and the first (D1), second (D2), and third (D3) order difference equations of the curve at the starting point assuming a unit step. These outputs are calculated from the equations:

D0=d
D1=a+b+c
D2=6a+2b
D3=6a

The terms a, b, c, and d are calculated differently for each curve type as follows:

Cubic Bezier:

a=dP1−2*dP2+dP3
b=3*dP2−3*dP1
c=3*dP1
d=P0

Quadratic Bezier:

a=0
b=dP2−dP1
c=2*dP1
d=P0

Cubic B-Spline:

a=dP1−2*dP2+dP3
b=3*dP2−3*dP1
c=3*dP1+3*dP1
d=6*P0+5*dP1+dP2

Quadratic B-Spline:

a=0
b=dP2−dP1
c=2*dP1
d=2*P0+dP1

Vector or Line:

a=0
b=0
c=dP1
d=P0

Figure 11:
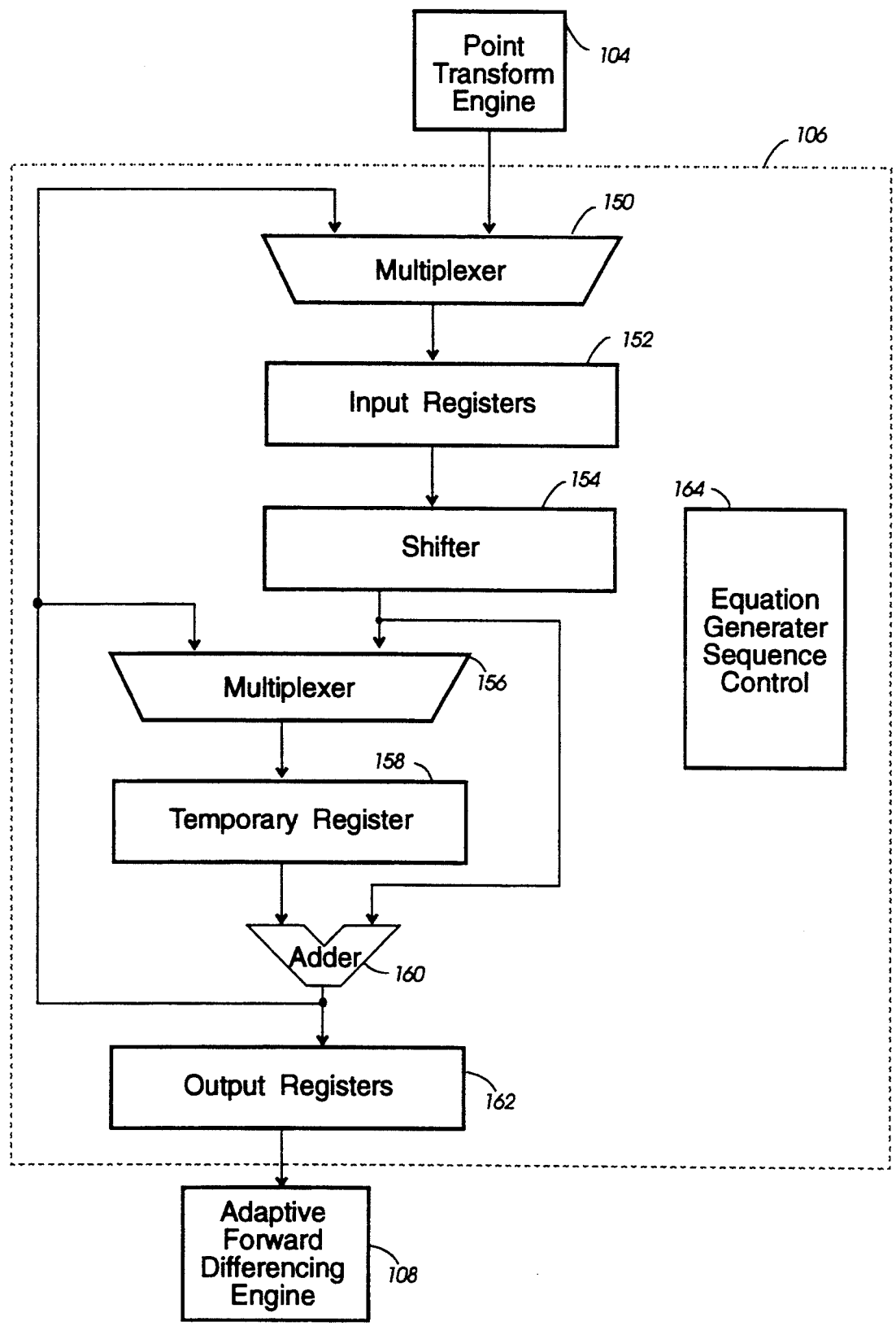
FIG. 11 is a block diagram illustrating the principal functional components of the parametric equation generator.

The equations are evaluated in two passes through the data processing portion of this unit. Referring now to FIG. 11, the transformed control points are input to an input register 152 via an input multiplexer 150. Multiplication by integers is handled by a shifter 154 and an adder 160 with a temporary register 158 used as an accumulator. The shifter 154 is a combinatorial left shift function, implemented as a multiplexer, capable of shifting 0, 1, or 2 positions providing the equivalent function of multiply by 1, 2, or 4. The adder 160 is a signed 2 input adder/subtracter.

In the first pass, the control points are processed to calculate the parametric coefficients a, b, c, and d, for both X and Y coordinates, and then are stored back into the input registers 152. In the second pass the coefficients are processed into the four difference equation parameters for both X and Y, and stored into the eight output registers 162. These registers are referenced as follows:

Z0[x,y]: 0th order difference for x and y equations
D1[x,y]: 1st order difference for x and y equations
D2[x,y]: 2nd order difference for x and y equations D3[x,y]: 3rd order difference for x and y equations The equation generator sequence control 164 controls the order of load commands for the registers and controls the function of the multiplexers and shifter.

The adaptive forward differencing engine 108 uses one of a number of well-known forward differencing techniques such as, for example, that technique disclosed in Sun Microsystems (U.S. Pat. No. 4,855,935) "Method and Apparatus for Rendering Vectors Using Bresenham Parameters".

The transition detection engine 110 is described in detail in co-pending U.S. Patent Application of Jim C. K. Lo and James C. Y. Lung entitled "Fast Vertical Scan-Conversion and Filling Method and Apparatus for Outline Font Character Generation in Dot Matrix Devices" U.S. Ser. No. 07/730,181 filed Jul. 12, 1991 and assigned to the assignee of the present application, the disclosure of such application being expressly incorporated herein by reference. A feature of the transition detection engine 110 that is particularly relevant to the present invention is the vertical or Y scan capability.

Figure 12:
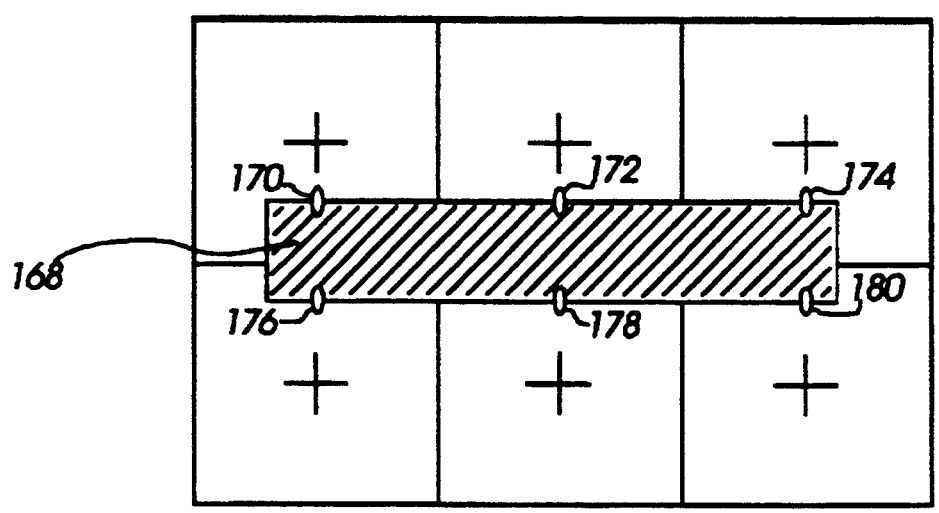
FIG. 12 is a diagram depicting the deficiency in horizontal scan techniques.

A thin horizontally oriented feature can be overlooked by horizontal scanning if the feature crosses no pixel Y centerline. For example, referring to FIG. 12 which depicts a very small minus sign ("—") character 168. During a horizontal scan the entire character is missed because no portion of the character crosses a pixel Y centerline. However, if the character had been scanned in the vertical or "Y" direction transitions would have been detected at six points 170 through 180. These transitions are not added to an X transition map because they can not preserve horizontal parity and could prove redundant. A separate Y transition map records these vertical or Y transitions 170-180. The transition processor 112, described below, processes these Y transition points.

Figure 13:
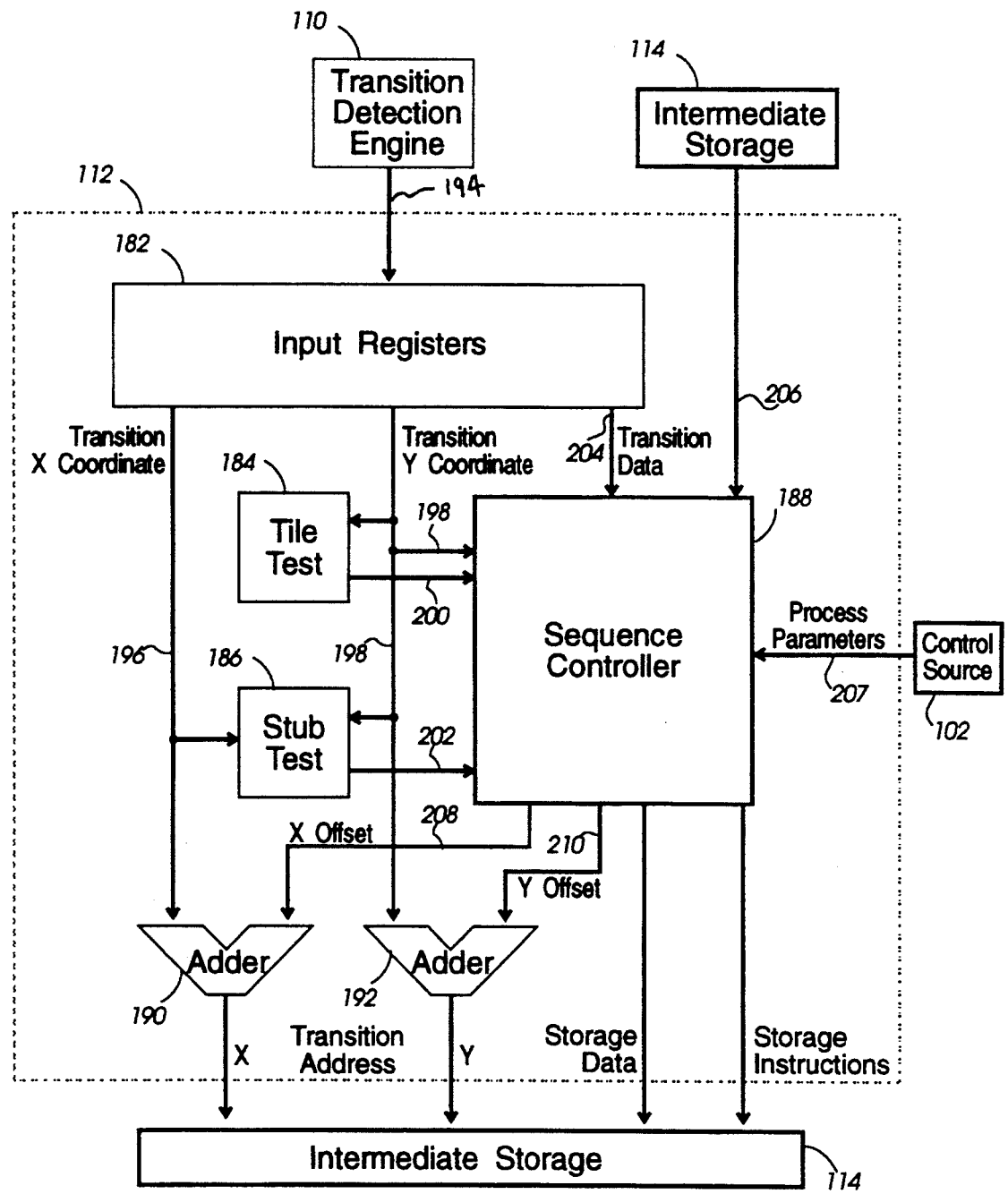
FIG. 13 is a block diagram illustrating the principal functional components of the transition processor.

The transition processor 112 is depicted in FIG. 13. The processor 112 is made up of a set of input registers 182, a tile test device 184, a stub test device 186, a sequence controller 188, a X coordinate adder 190 and a Y coordinate adder 192. The registers 182 receives a set of coordinates of a current transition pixel and other information via an input bus 194. The X coordinate of the current transition pixel is transferred to the stub test device 186 and the X coordinate adder 190 via an X coordinate bus 196. The Y coordinate of the current transition pixel is transferred to the stub test device 186, the tile test device 184, the sequence controller 188, and the Y coordinate adder 190 via a Y coordinate bus 198. The tile test device 184 operates on the Y coordinate of the current transition pixel to generate a TileOk signal 200. The stub test device 186 operates on the X and Y coordinates of the current transition pixel to generate a Stubflag signal 202. The sequence controller 188 receives as input the Stubflag signal 202, the TileOk signal 200, a set of current transition data 204, a set of stored transition data 206, and a set of process parameters 207. The sequence controller 188 operates on these various inputs to generate an X coordinate offset 208 and a Y coordinate offset 210. The X offset 208 is added to the X coordinate of the current transition pixel by the X coordinate adder 190. In similar fashion, the Y offset 210 is added to the Y coordinate of the current transition pixel by the Y coordinate adder 192.

Figure 14:
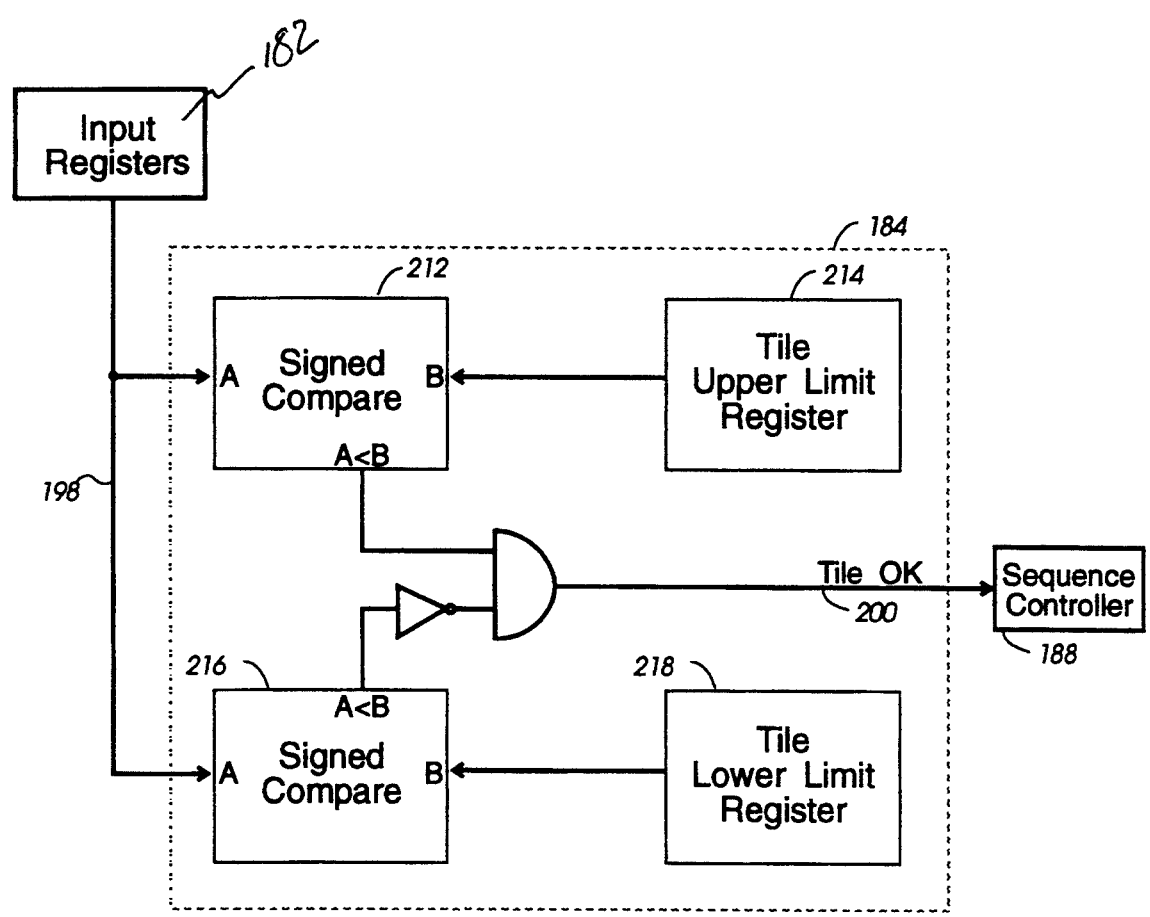
FIG. 14 is a block diagram illustrating the principal functional components of the tile test device.

The stub test device 184 determines whether the current transition applies to the current process. In some instances, the character being processed is too large to be stored in the intermediate storage. When this happens the character must be partitioned into manageable portions. Referring now to FIG. 14, the tile test device consists of an upper limit comparator unit 212, a tile upper limit register 214, a lower limit comparator unit 216, and a tile lower limit register 218. If the Y coordinate of the transition pixel is below the upper limit and above or equal to the lower limit, the TileOk signal 200 is sent to the sequence controller and the transition will be processed, otherwise it is discarded. Thus, an overly large character will be sliced into horizontal bands as defined by the contents of the limit registers 214, 218 and each band is processed as if it were a separate character.

Figure 15A:
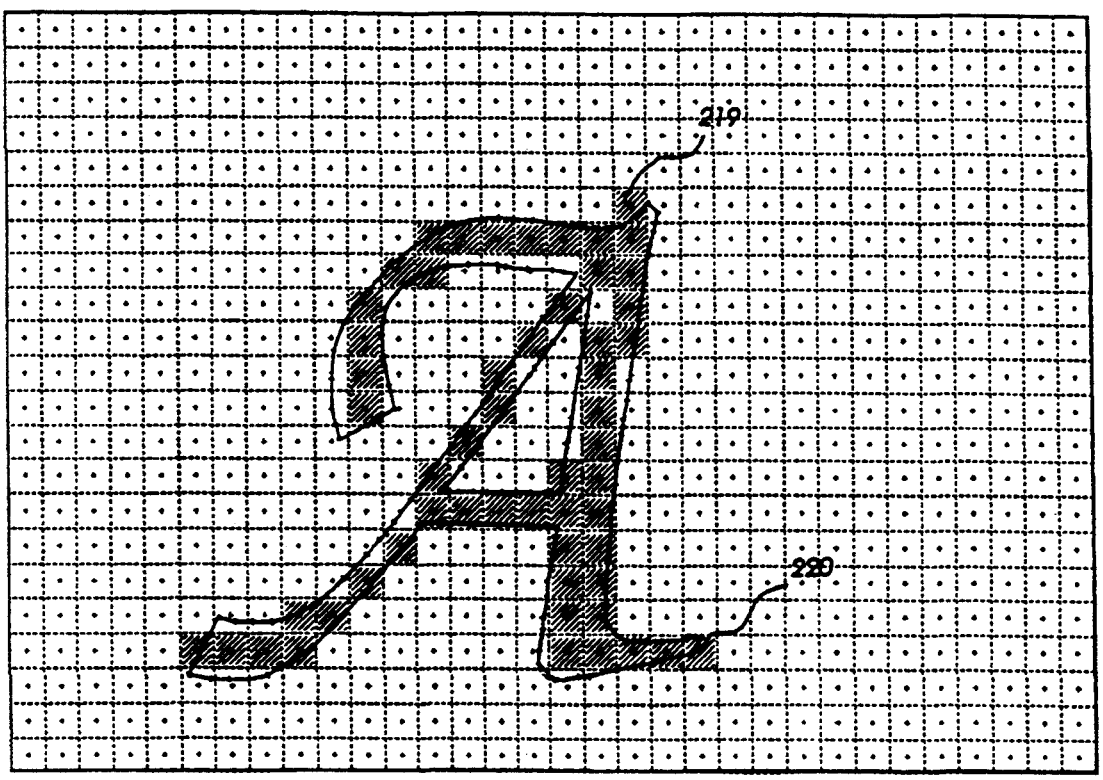
FIGS. 15a and 15b are diagrams depicting a character rendered with and without stub suppression.
Figure 15B:
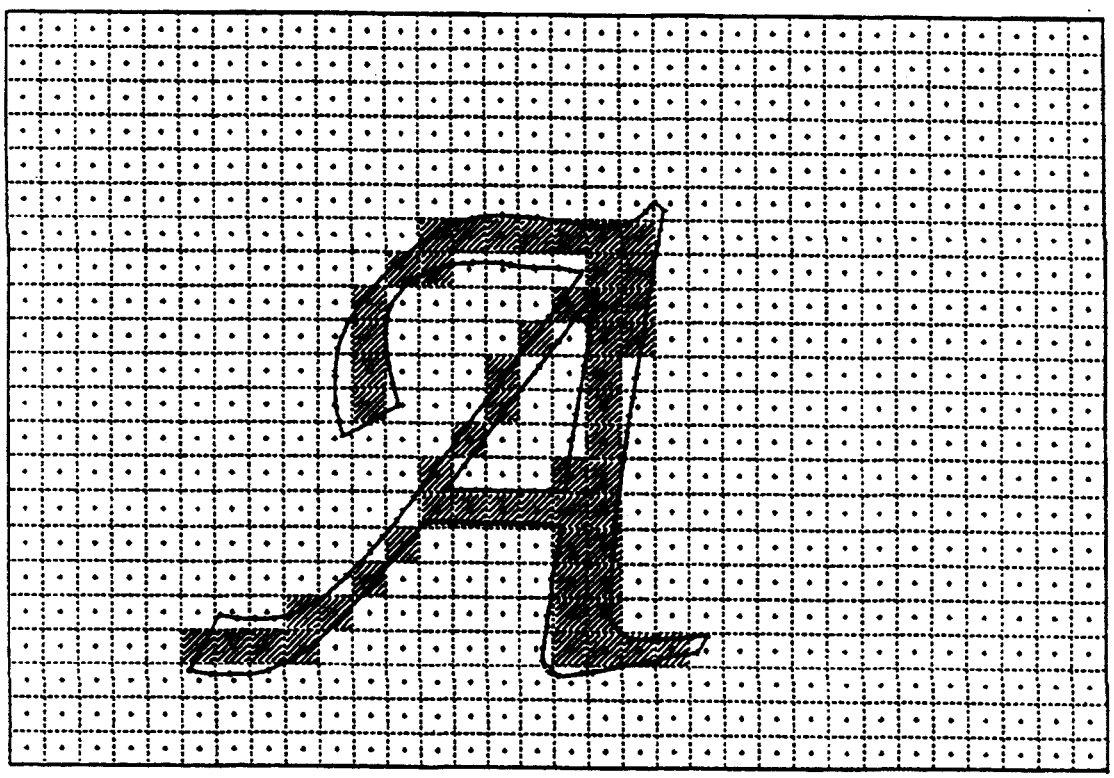
Figure 16:
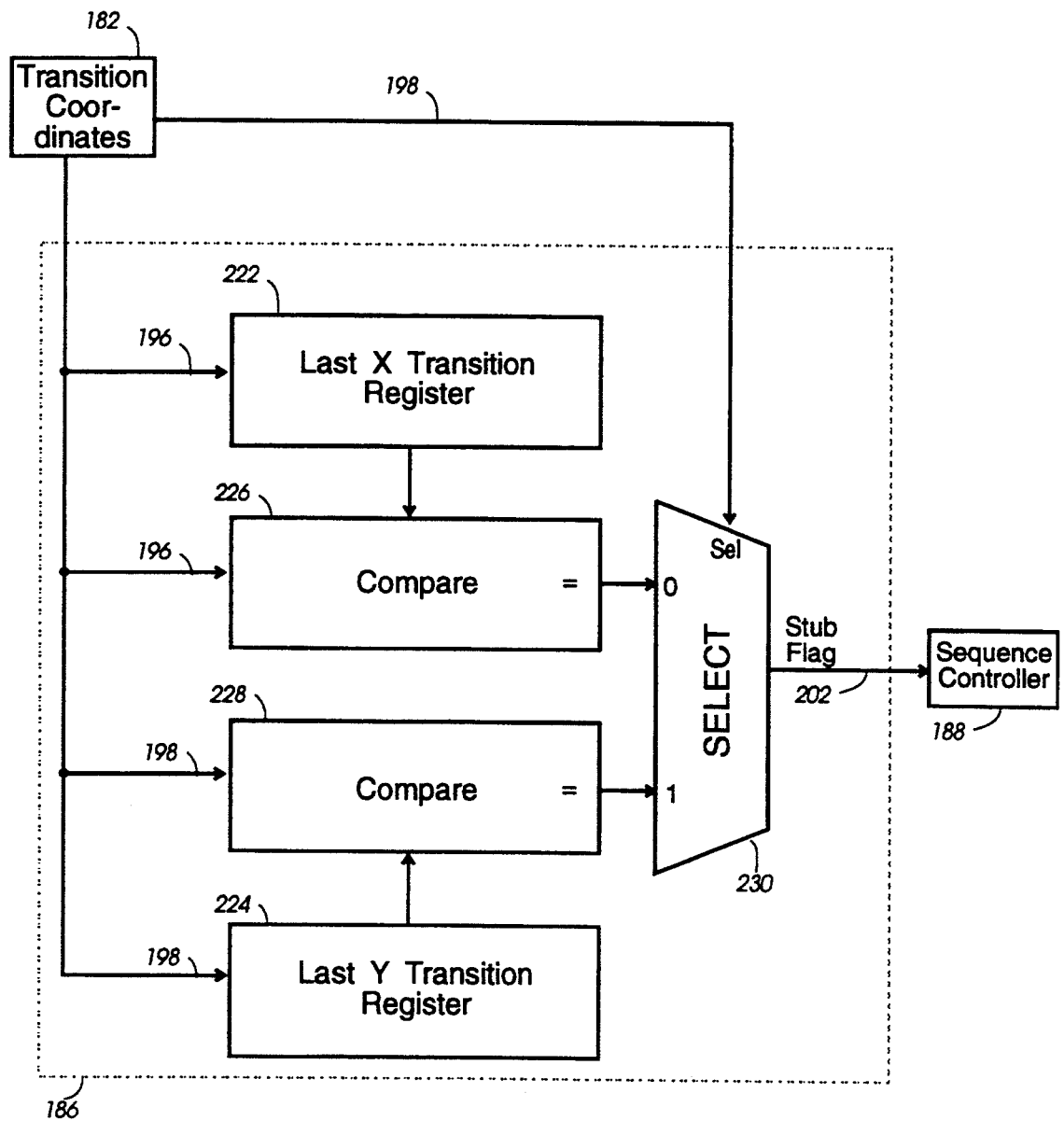
FIG. 16 is a block diagram illustrating the principal functional components of the stub test device.

The stub test device 186 suppresses serifs on small characters when an extra pixel can detract from the character's appearance. FIG. 15A shows a capital "A" rendered without stub suppression. FIG. 15B shows the same character with two pixels, 219 and 220, removed through stub suppression. The stub test device 186, illustrated in FIG. 16, is comprised of a last X transition register 222, a last Y transition register 224, an X coordinate comparator 226, a Y coordinate comparator 228, and a multiplexer 230. A stub is defined when two consecutive X transitions or Y transitions occur at the same location. When this occurs, the old transition is turned off and no new transition is written. The figure shows that the coordinates for the current transition pixel are compared against the coordinates of the previous transition pixel. Thus, the X coordinates of the current and previous transition pixels are compared by the comparator 226 and the Y coordinates are compared in comparator 228. If a Y transition is being processed, then the multiplexer 230 selects the output from comparator 228 as the StubFlag signal 202. If an X transition is being processed, the output from comparator 226 is selected as the StubFlag signal 202.

The sequence controller 188 operates on a plurality of inputs to generate corrections or offsets to the current transition pixel address. The input 206 from intermediate storage 114 is variable in length from one to four bits depending on the particular processing operation conducted. One bit, designated "E" is always used to indicate the existence of a transition from the horizontal scan (i.e. an Xmap existence bit). When doing non-zero winding processing one bit, designated "D", is used to indicate segment direction. When dropout prevention is applied one bit, designated "Y" is used to indicate the presence of a transition from a vertical scan (i.e. a Ymap existence bit). When allowing black patches one bit, designated "P" is used to indicate the occurrence of a black patch (i.e. a patch bit). The input 207 from the control source 102 specifies a set of process parameters that govern the operation of the sequence controller 188. These process parameters instruct the controller 188 to perform dropout protection, select a particular displacement method, select a particular patching method, and detect collisions. The process parameters also designate, to the controller 188, the fill algorithm to be employed by the bitmap converter 116.

A collision occurs when multiple transitions are assigned to the same pixel in the same map (i.e. X or Y map). If the controller 188 is instructed to detect collisions then a particular biasing method will be employed. The displacement method used by the sequence controller 188 is specified by an input parameter. For the Even-Odd algorithm two alternatives are provided. The first alternative turns off the first transition point and accepts only the second transition point. The second alternative displaces the second transition to a location to the immediate left or right. Both alternatives preserve scan line parity, however the first alternative can cause small features to disappear while the second alternative preserves fine detail. When a collision occurs during the displacement the opposite direction is tried; if that also collides then the transition in the original location is cancelled.

For the Non-zero Winding algorithm scan count must be preserved. The displacement method used for this algorithm is as follows:

If the value (+1 or −1) of a current transition is opposite of that of a transition already stored at that location, then set the location to indicate no transition.

If the value is the same, displace the transition to the left or right; in case of a another collision of like value, displace to the opposite side.

If further collisions of like value occur, go to the next position on the opposite side alternating until an empty position or a transition of opposite value is found.

Figure 17:
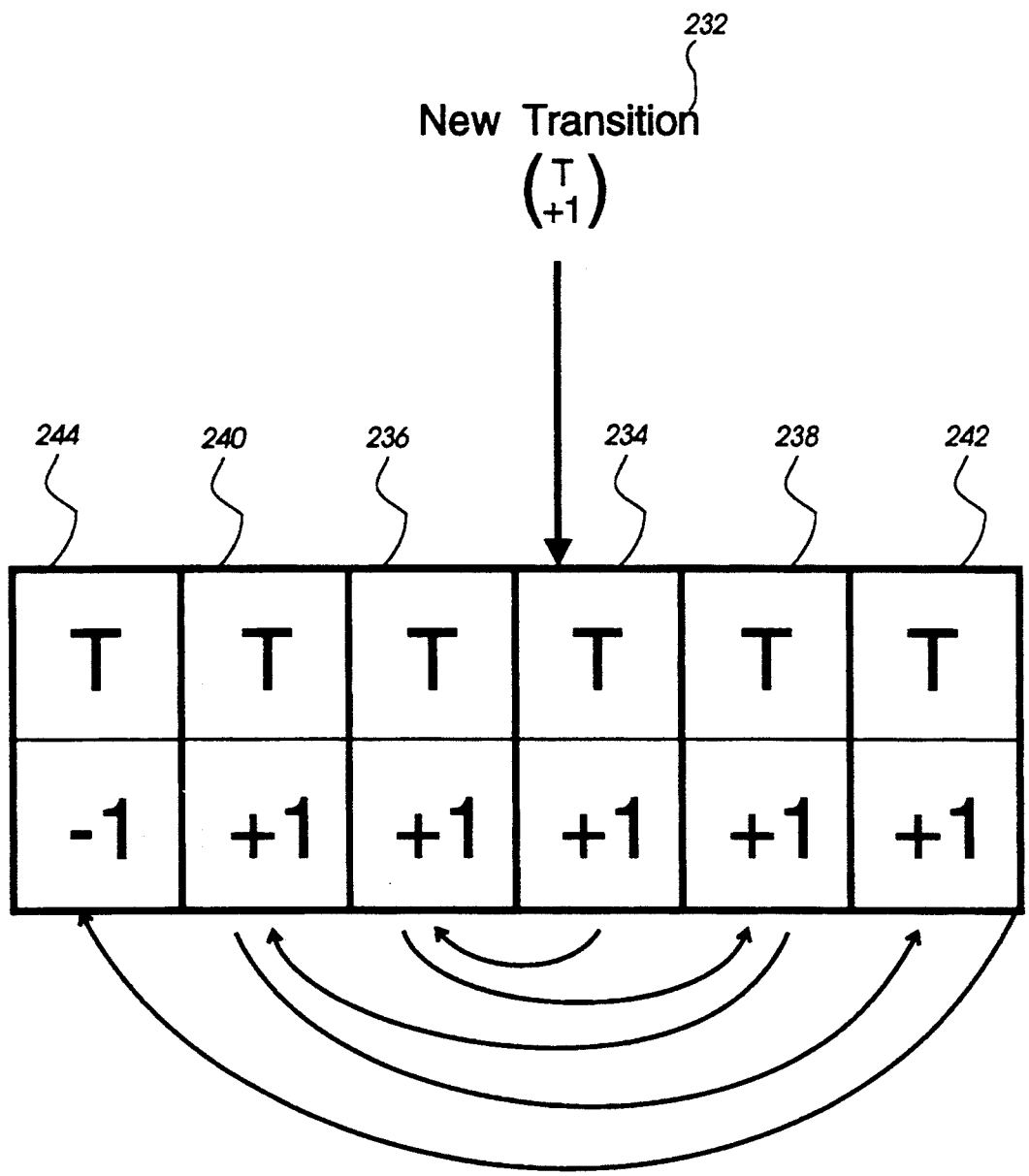
FIG. 17 is a diagram illustrating the bias or displacement technique used when the character is filled using the Non-Zero winding algorithm.

FIG. 17 illustrates the described displacement method. In the particular method illustrated, a left bias method is employed. The current or new transition 232, of value +1, is to be mapped at location 234. However, a transition pixel, of value +1, is already mapped at location 234. Thus, a collision takes place at location 234. Since this is a left bias displacement method, the transition 232 is displaced to location 236 which causes another collision. The transition 232 is again displaced to location 238, then to location 240, then to location 242, and finally to location 244. Since location 244 has a pixel of opposite value to the new transition 232, a "no transition" is written at location 244.

Figure 18:
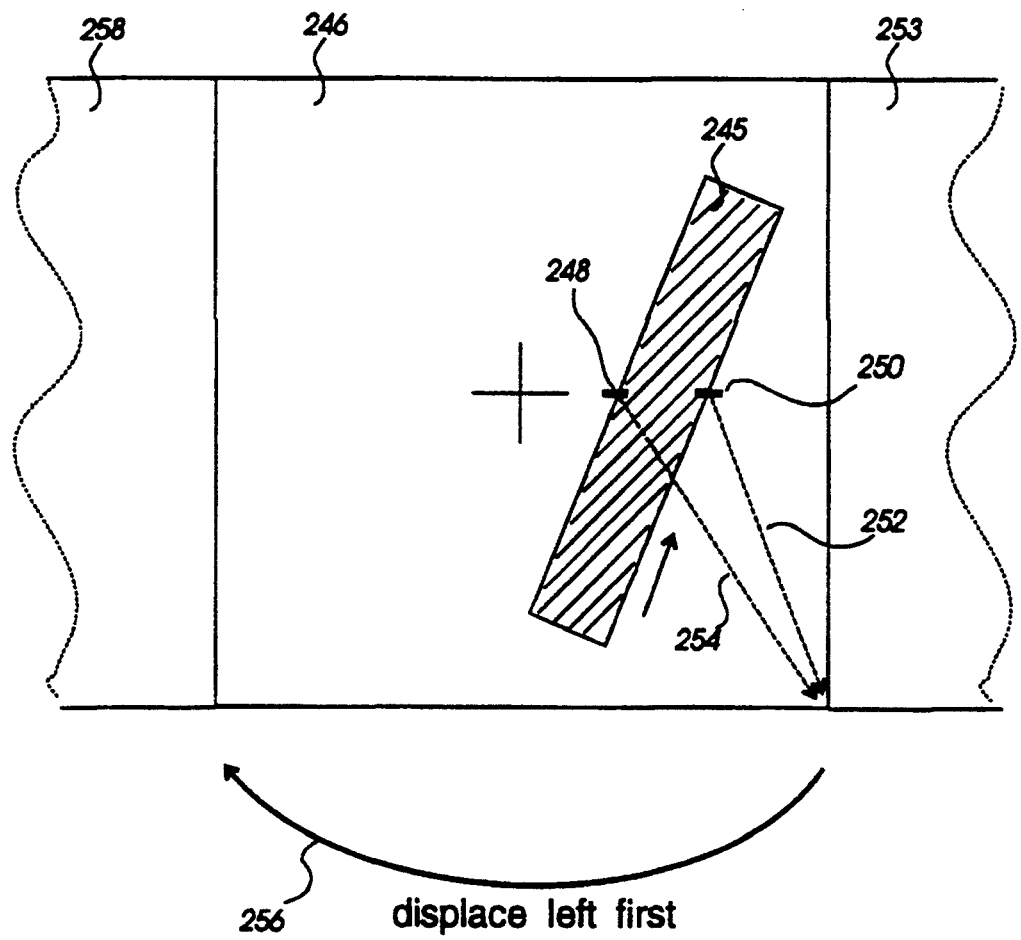
FIG. 18 is a diagram depicting a particular displacement method (left bias)

There are three bias options available: a left bias, a right bias, and an auto bias. The initial displacement of the transition is to the left in the left bias and to the right in the right bias. The auto bias option selects right or left bias on a transition by transition basis. If a segment has a diagonal positive slope then the left bias option will be used. If a segment, with a Y transition only, is horizontal and the transition has been offset to the right by the 50—50 transition rule then the left bias option will be used. For all other cases, the right bias option will be used. FIG. 18 illustrates an example of left bias collision handling. The figure depicts a small sloped rectangle 245 which fits within a single pixel 246. During a scan, a transition on the left side 248 and a transition on the right side 250 are produced. Using the 50—50 rule transition 248 is assigned 254 to a pixel 253. However, under the same 50—50 rule, transition 250 is also assigned 252 to the same pixel 253 thereby causing a collision. Left bias collision handling causes transition 248 to be displaced 256 to a pixel 258 to the left.

Figure 19A:
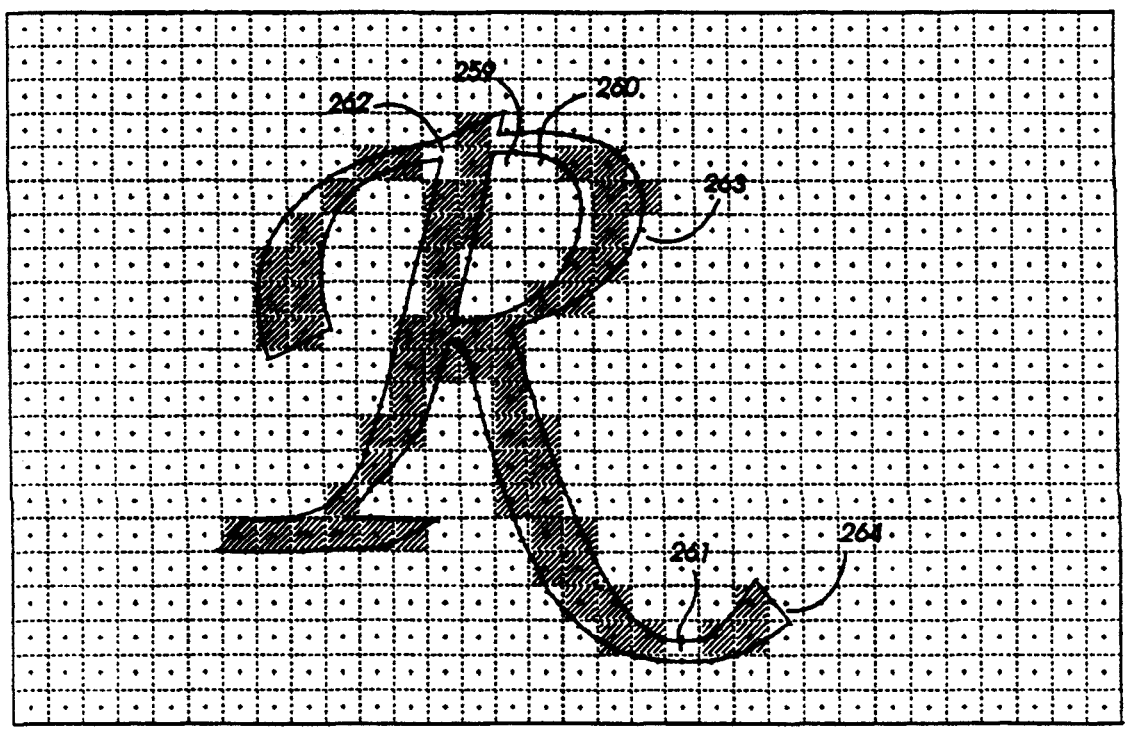
FIGS. 19a and 19b are diagrams depicting a character rendered with and without dropout control.
Figure 19B:
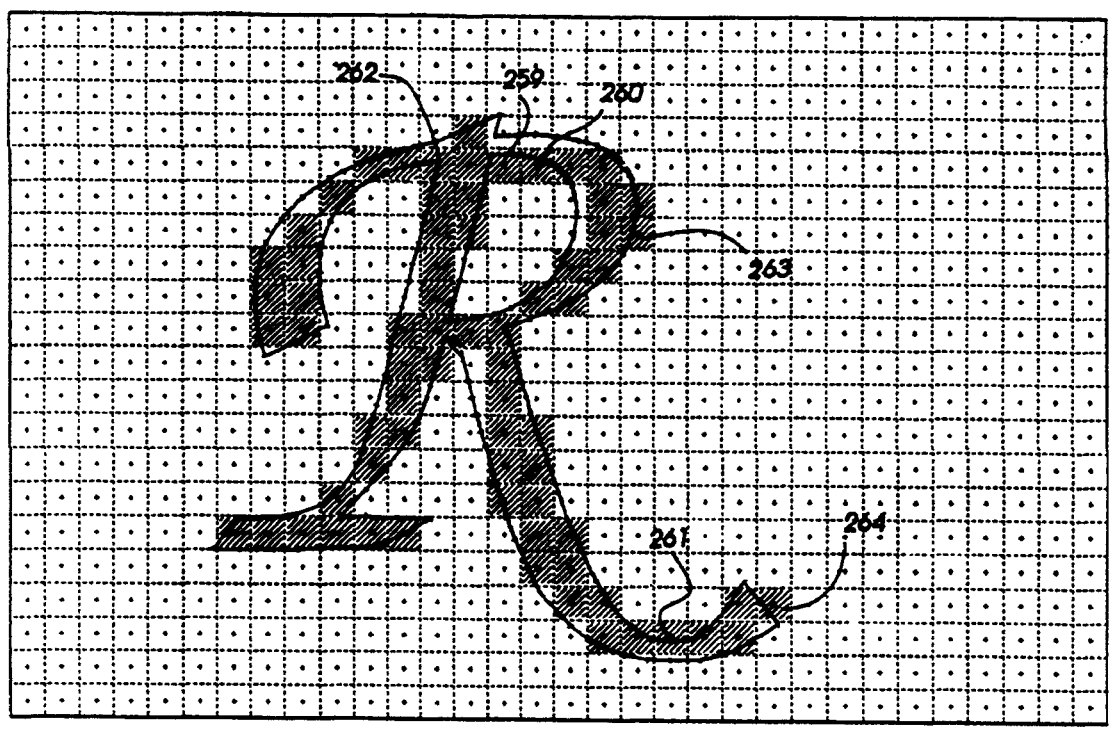

Horizontal scanning, as pointed out earlier, can overlook thin horizontal features. Consequently, vertical or Y scanning is performed on smaller characters to compensate for this deficiency in the horizontal or X scan. A separate Y map is kept for the recording of vertical or Y transitions, however no conversion to bitmap is done on these Y map transitions. A collision occurs in the Y map where Y transitions do not interfere with the X map but do add information. Consequently, a fine feature found by a Y scan, but missed by an X scan, will not be represented in the X map. At these collision points in the X map a patch can be placed to enhance the final output image of the character. This patch can take one of two forms, a transition pair patch to the X map, or a black patch to the final character. FIG. 19a illustrates a character without patching. FIG. 19b shows the same character with patching performed. The patches 259-264 occur at the junction of a descender and the main body of the letter which is removed because of horizontal scan collision displacement.

Figure 20:
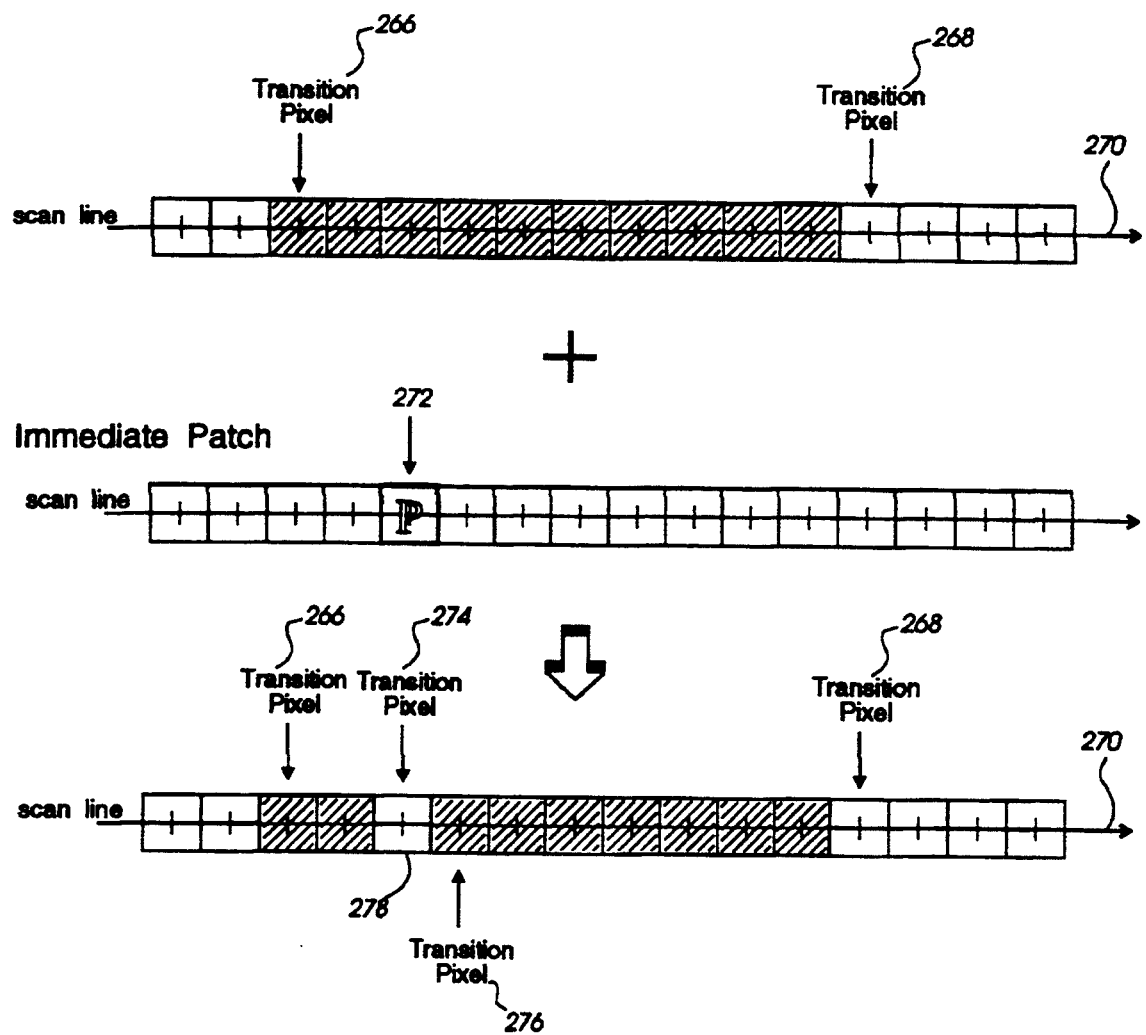
FIG. 20 is a diagram showing an application of the immediate or toggle patch technique.

The first option, which can only be used with the Even-Odd fill algorithm, is to write an immediate or toggle patch at the corresponding collision location in the X map. A single pixel of opposite polarity in the X map will result at the point of collision in the Y map. In case of a collision between the patch and an existing transition in the X map, the existing transition is turned off. FIG. 20 shows the application of an immediate patch. An existing X map 267 is shown with two well separated transitions 266 and 268. An immediate patch is introduced at point "P" 272 and produces a transition 274 at the corresponding location 278 of the X map 270 and at a position 276 to its immediate right. The converted X map now features a white pixel, at location 278, in what had been a solid black span.

The second option (the only patching method available for Non-zero winding) is the black pixel patch. After a collision is handled in the Y map an entry is made into a patch map which is later written into the bitmap converted character.

Figure 21A:
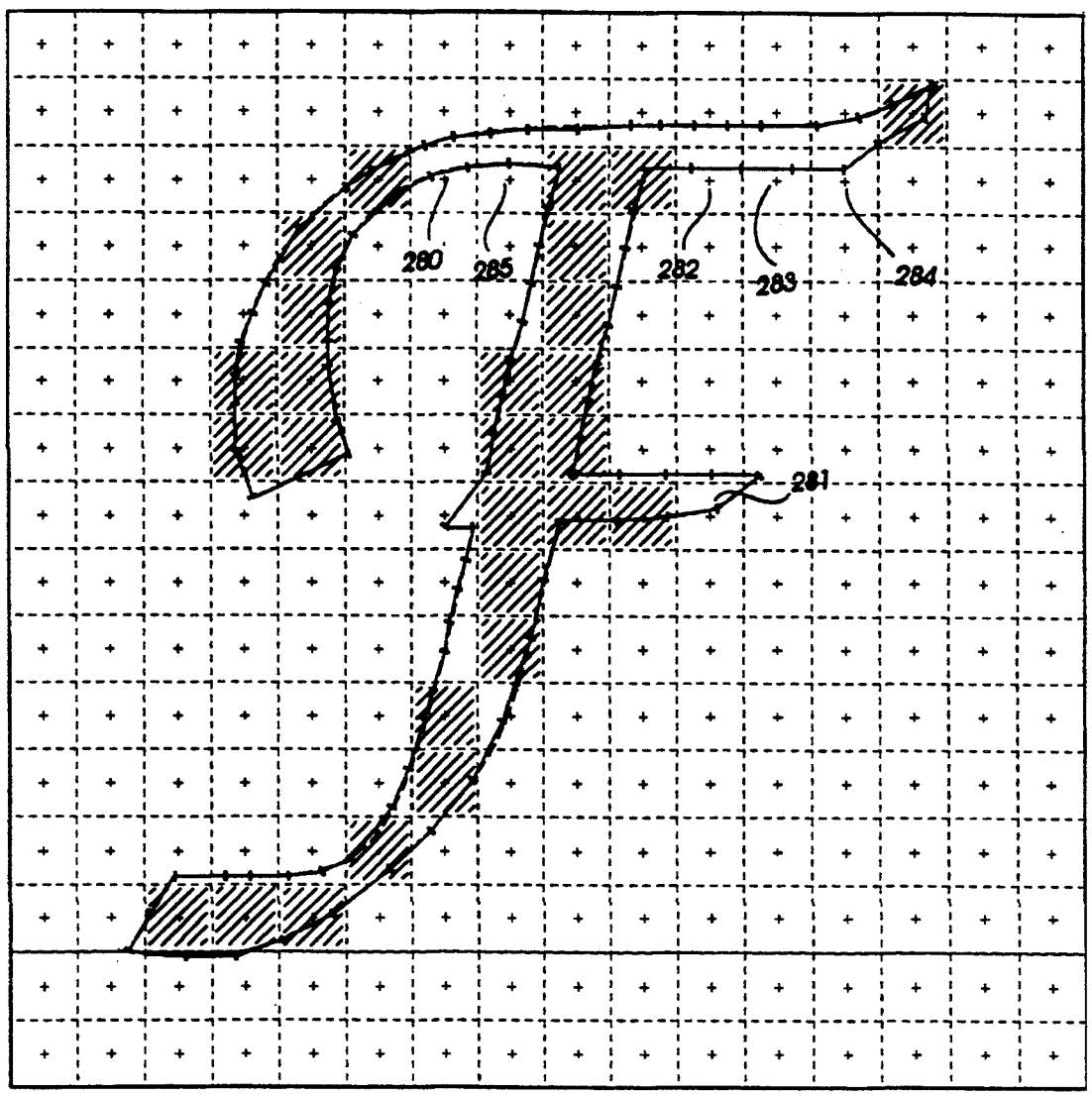
FIGS. 21a, 21b and 21c depict a character rendered without dropout control and with dropout control with a toggle patch or with a black patch.
Figure 21B:
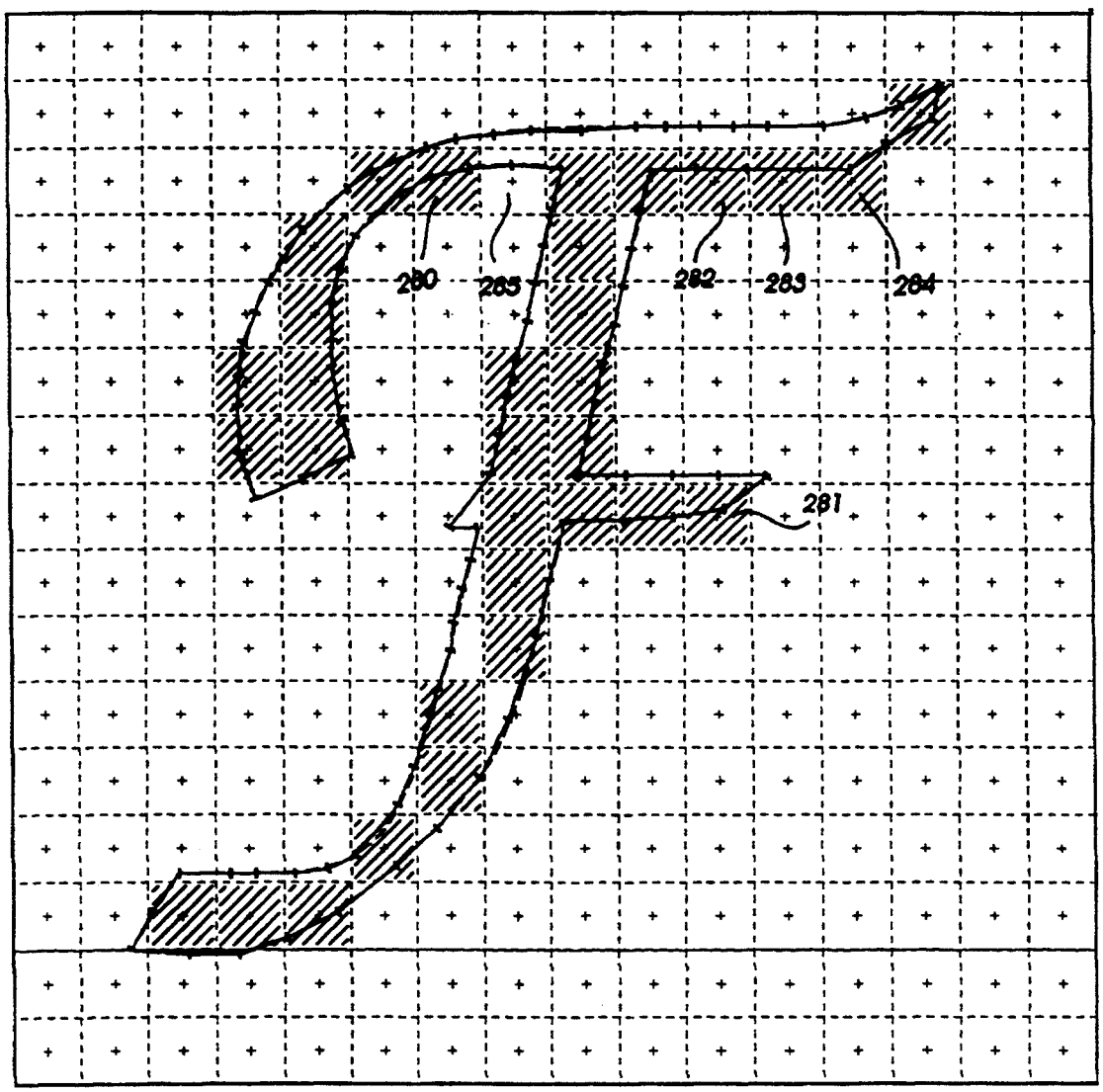
Figure 21C:
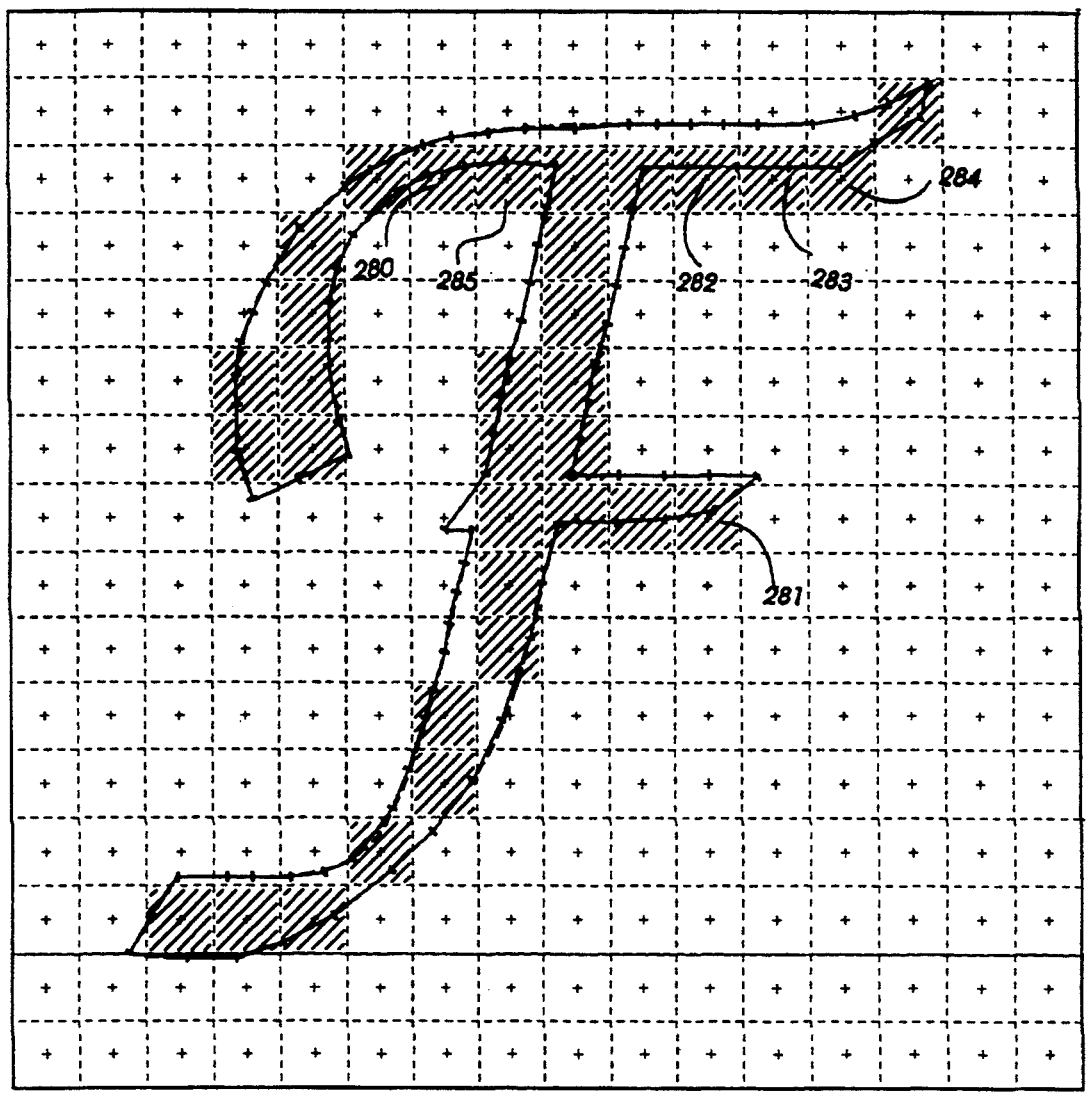

FIG. 21a shows a capitol "F" with no dropout correction. FIG. 21b shows the same character, with dropout correction using toggle patches recovering five dropped pixels 280-284. FIG. 21C shows the same character with dropout correction using black pixel patches recovering six dropped pixels 280-285.

Figure 22A:
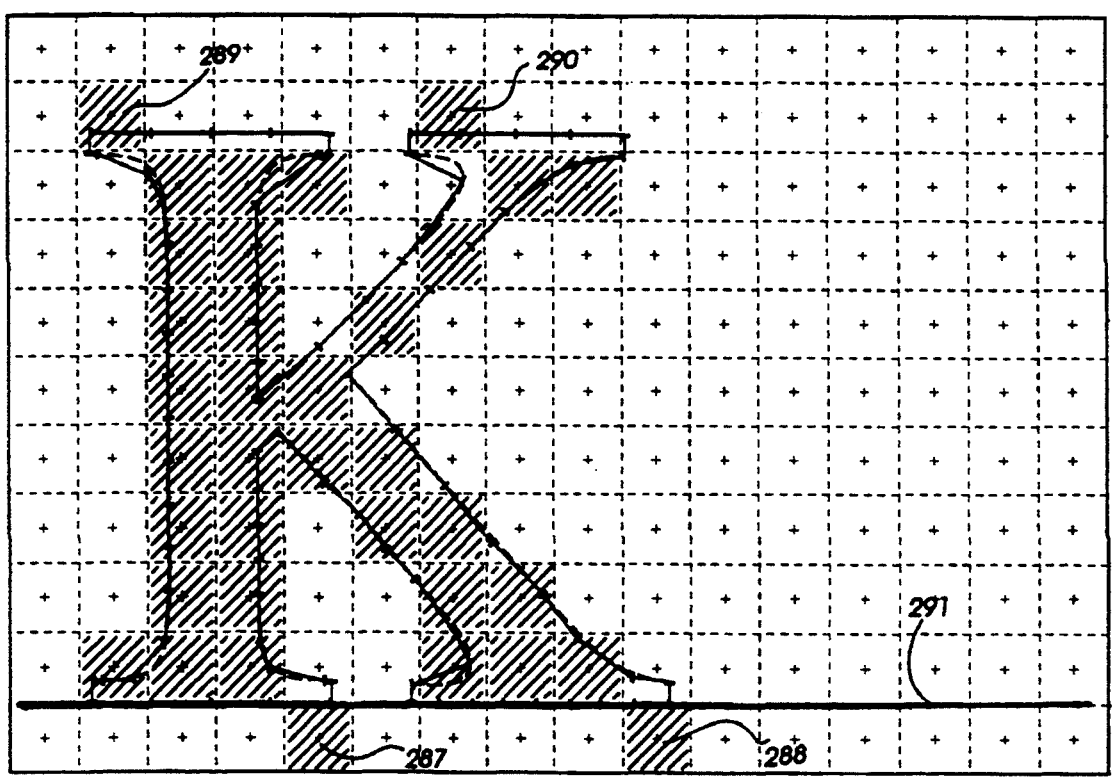
FIGS. 22a and 22b depict a character rendered with and without Y alignment.
Figure 22B:
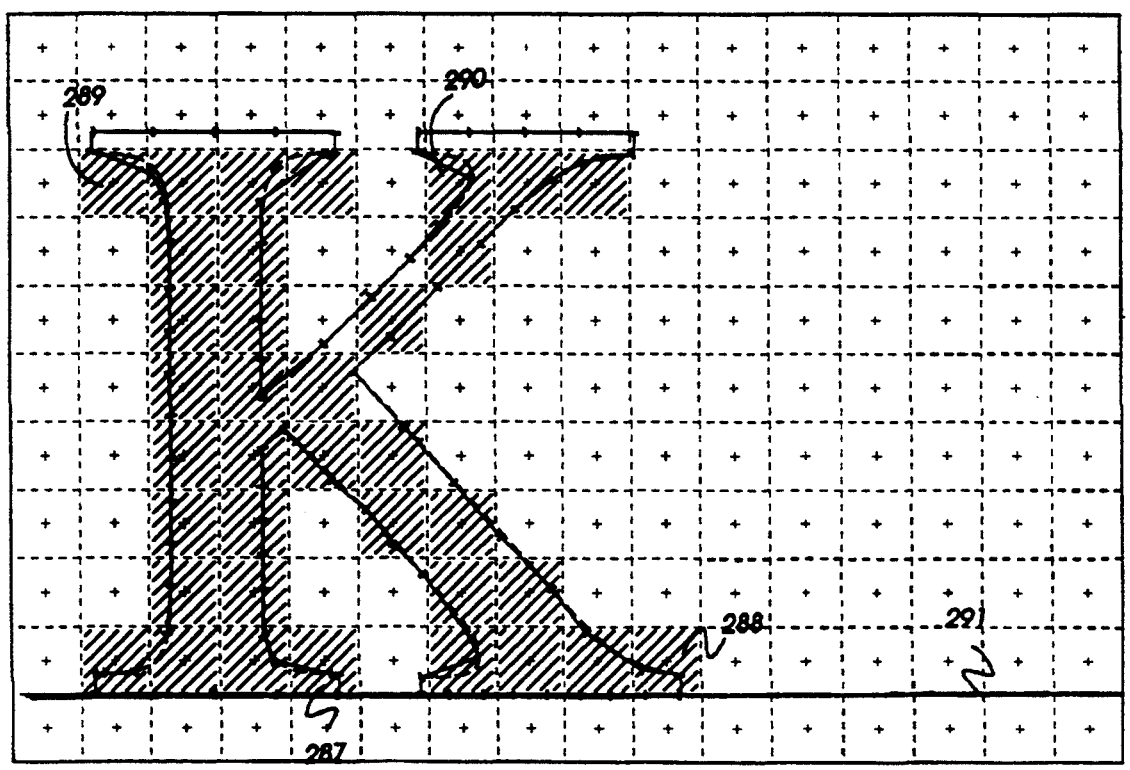

Another technique for enhancing the image output is Y alignment. This technique prohibits any attempted bias away from the baseline. FIG. 22a shows an Even-Odd filled "K" processed with autobias but without Y alignment. The residual artifacts 287-290 detract from the character's final appearance. FIG. 22b depicts the same character processed with Y alignment. The residual artifacts 287-290 have been moved toward the character baseline 291 and into alignment with the rest of the character. When the Y alignment option is set, the sign of the Y coordinate is checked. If the value of the sign as seen by the sequence controller is zero (i.e., on or above the character baseline) the displacement for a Y transition is always down. If the sign is 1 (i.e. below the baseline) the displacement for a Y transition is always up. This overrides any other bias that may be set in the dropout prevention mode.

Figure 23A:
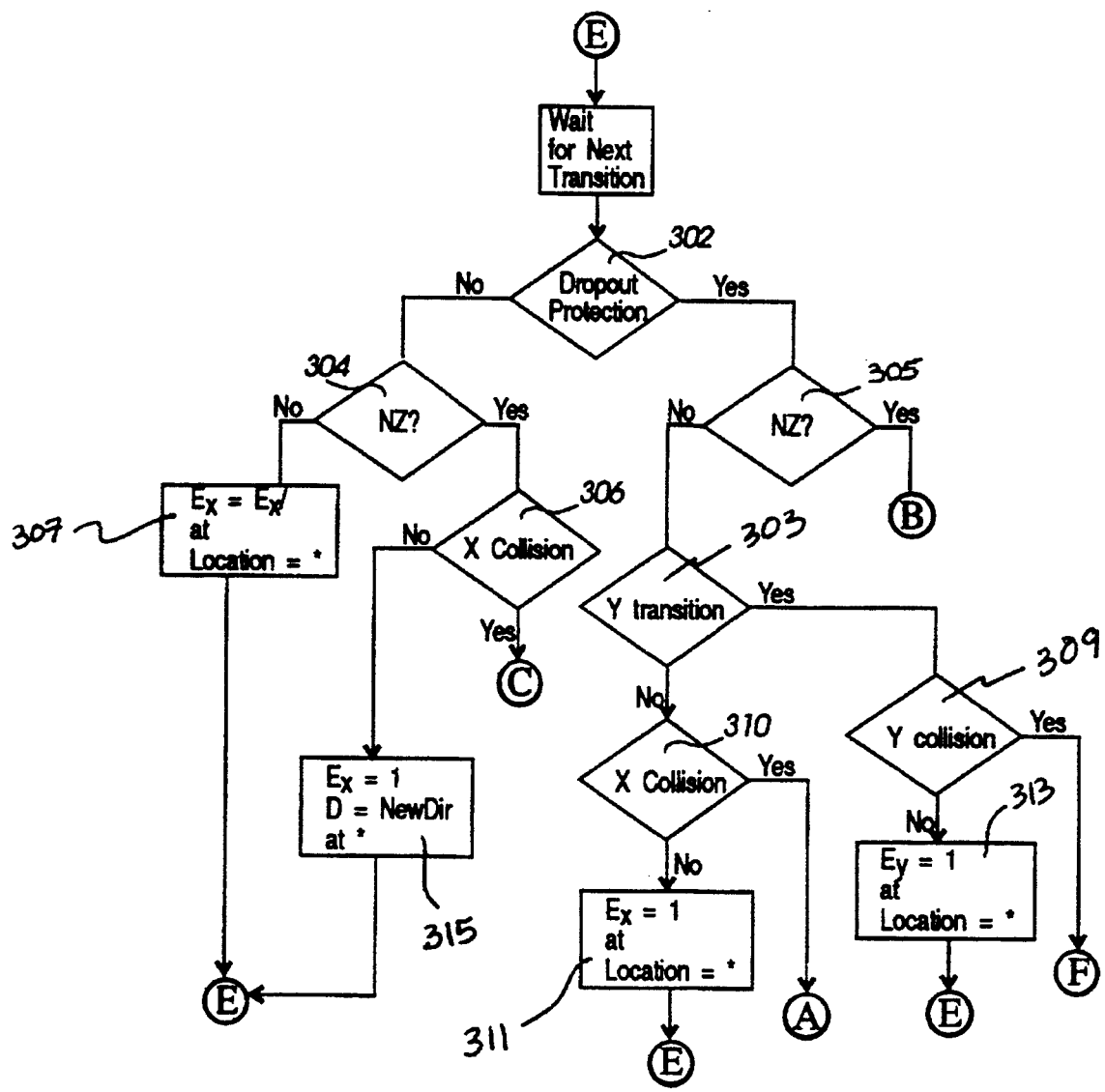
FIGS. 23a, 23b and 23c are logic flow diagrams depicting the operational sequence of the sequence controller device of the transition processor.

The operation of the sequence controller 188 is illustrated in FIG. 23a. Referring now to FIG. 23a, the process parameters 207 (not illustrated on the figure) are read by the processor 188. The initial decision 302 is to determine whether dropout protection is required. The second major decision 304 is to determine whether the Non-Zero Winding fill algorithm will be used to generate the bitmap. Since there are two major decisions, there are four major operational paths.

If there is no dropout protection and an Even-Odd fill method is to be used, then the existence bit ("E" bit) at the address location of the current transition pixel is set to a value opposite of the current value of the "E" bit.

Figure 23B:
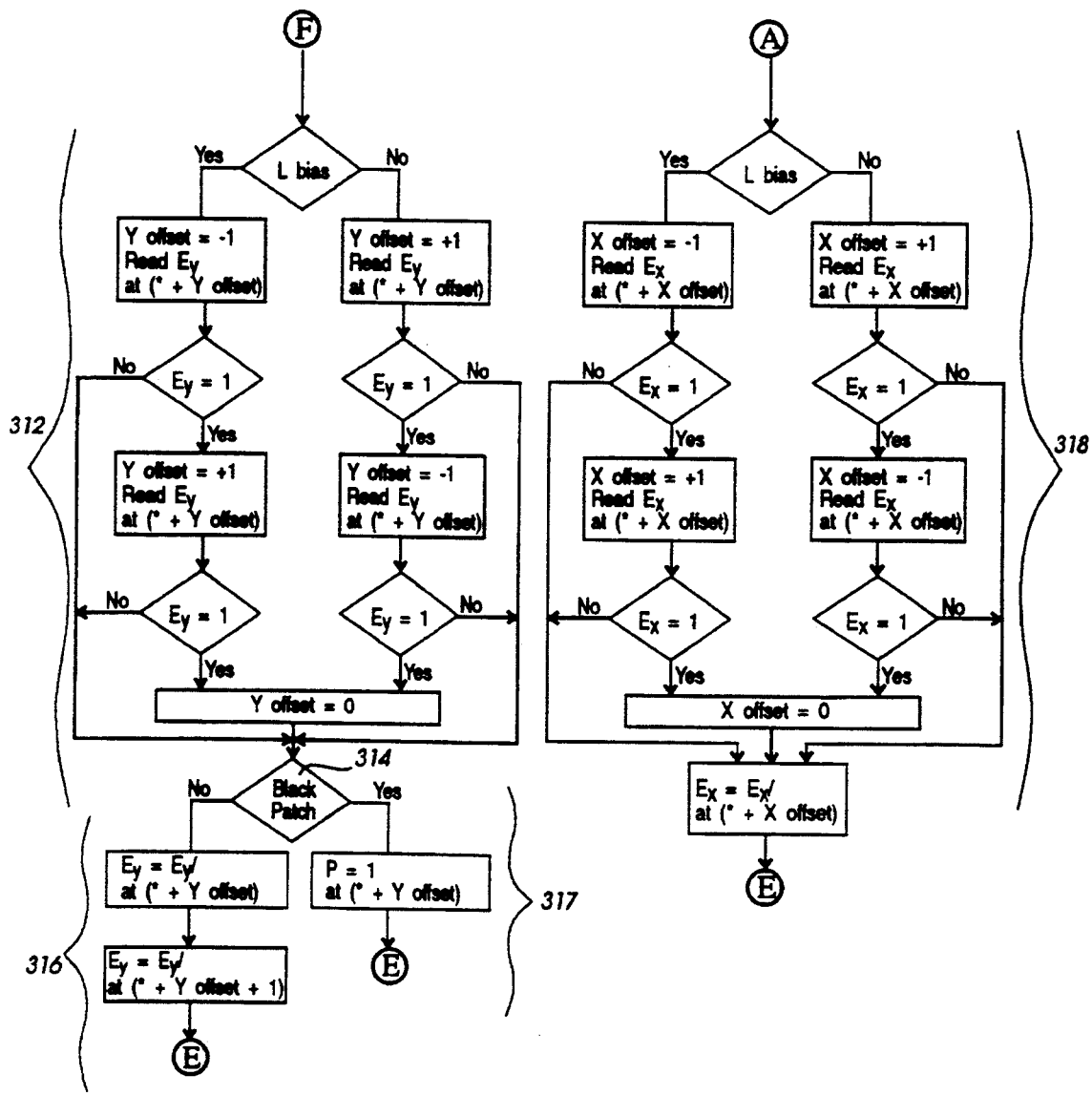

If there is dropout protection with the Even-Odd fill algorithm, then the sequencer 188 (not shown) checks for collisions 310. If there are no collisions then the existence bit ("E" bit) at the address location of the current transition pixel is set to a value of "1". If there is a collision then the sequencer 188 (not shown) checks whether the current transition is a Y transition. Referring now to FIG. 23b, if the current transition is a Y transition, then the Even-Odd displacement method described earlier is employed in the Y orientation. At the conclusion of the displacement method, the patching method is selected 314. If the black patch method 317 is selected then a patch map "P" bit is set at the address of the current transition pixel at the displaced address. If the immediate or toggle patch method 316 is used then the method illustrated in FIG. 20 is employed. If the current transition is not a Y transition, then the previously described Even-Odd displacement method 318 is employed in the X direction.

Figure 23C:
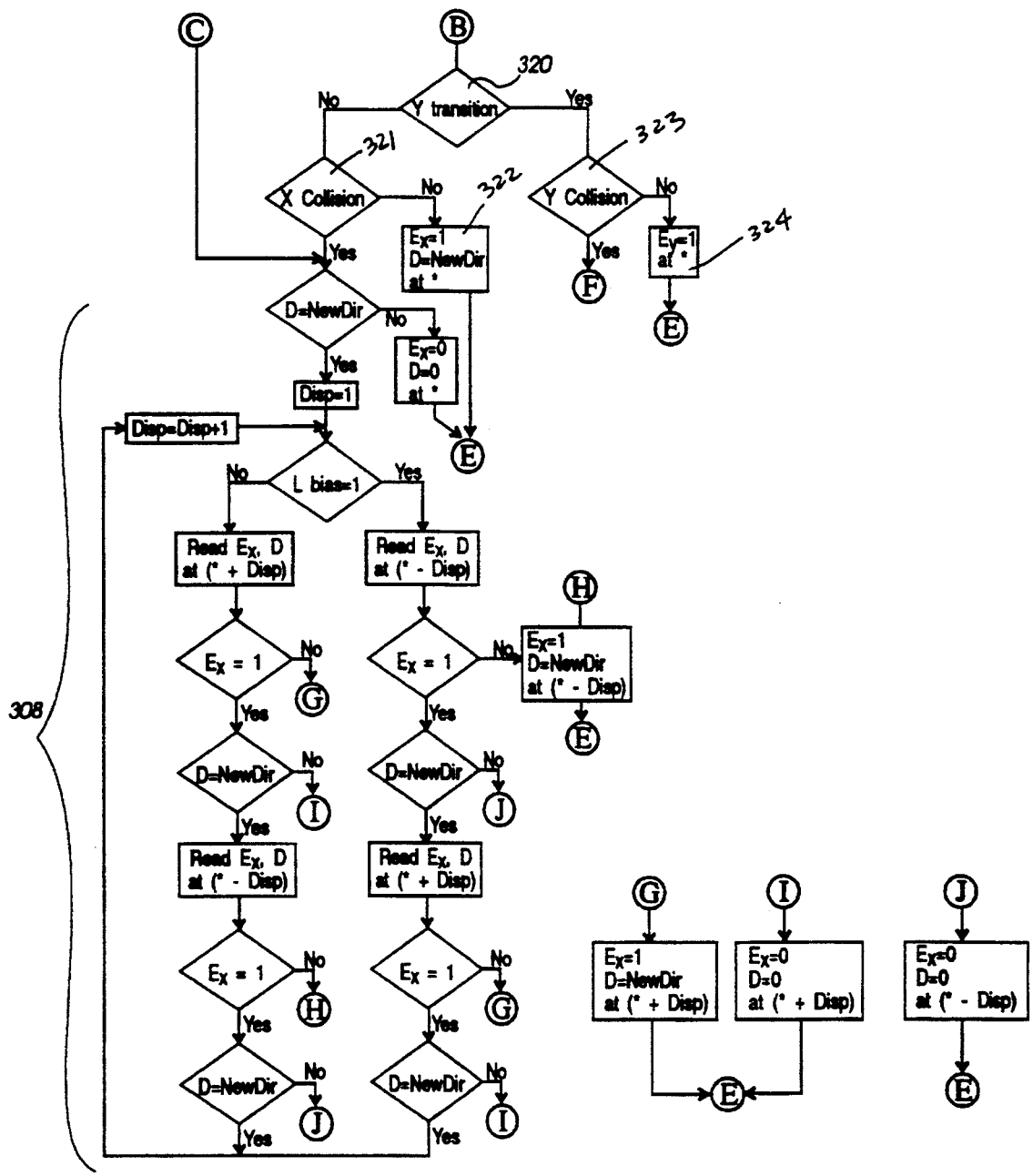

If there is no dropout protection and the fill method is the Non-Zero Winding algorithm, then the sequencer 188 (not shown) checks for collisions 306. If there are no collisions then at the address of the current transition pixel, the "E" bit is set to "1" and the direction bit ("D" bit) is set to the value of the current transition. Referring now to FIG. 23c, if there is a collision then the displacement method 308, illustrated earlier in FIG. 17, is employed.

Finally, if there is dropout protection with the Non-Zero Winding fill algorithm, then the sequencer 188 (not shown) checks for Y transitions 320. If the current transition is not a Y transition and there is no collision, then at the address of the current transition pixel the "E" is set to "1" and the "D" bit is set to a new value. If the current transition is not a Y transition and there is a collision, then the displacement method 308, illustrated earlier in FIG. 17, is employed. If the current transition is a Y transition and there is no collision, then the "Y" bit at the address of the current transition pixel is set to "1". If the current transition is a Y transition and there is a collision, then the displacement method 312 described earlier is employed in the Y orientation. At the conclusion of the displacement method, the proper patching method is selected 314. For non-zero processing, the toggle patch method is not allowed. The black patch method 317 is selected then a patch map "P" bit is set at the address of the current transition pixel plus some calculated offset.

The intermediate storage 114 is a RAM storage device with one entry stored per pixel. An entry, described previously, is four bits in length.

The present invention minimizes the bandpass bottleneck to the intermediate storage 114 by minimizing the amount of information transferred into and out of the storage 114. As transitions are processed their addresses are monitored to determine the minimum and maximum addresses in both X and Y directions. These four values represent a character bounding box. This box limits the area to be accessed to the area of the actual character image which may be considerably smaller than the workspace required to render the character. This technique also minimizes the area to be cleared in preparation for the next character.

Figure 24:
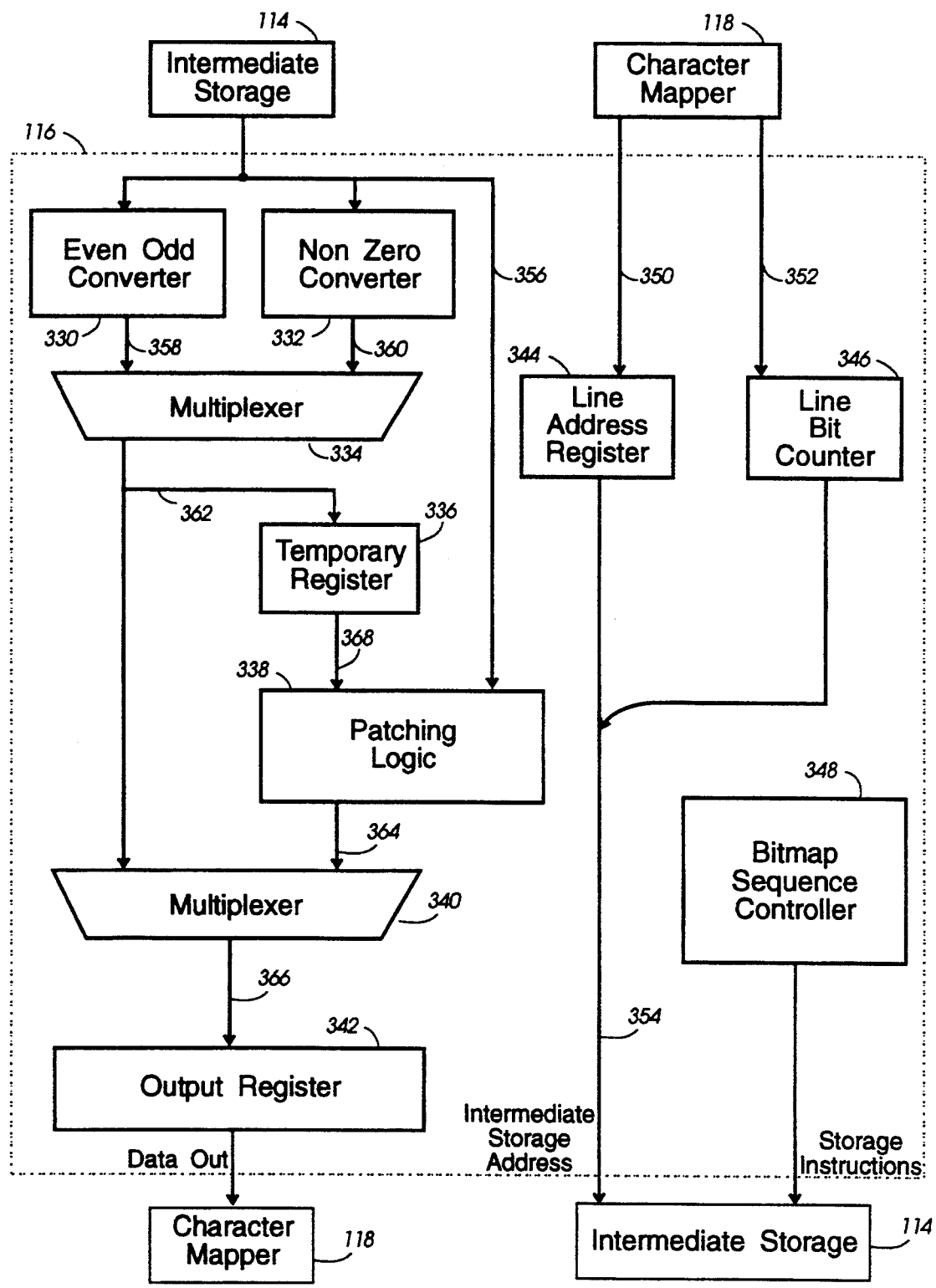
FIG. 24 is a block diagram illustrating the principal functional components of the bitmap converter.

The bitmap converter 116 converts the transition map to a bitmap, including all appropriate patches, on a line by line basis, providing the bit map data directly to the character mapper 118. Referring now to FIG. 24, which illustrates the bitmap converter 116 design. The converter 116 consists of an Even-Odd converter 330, a Non-Zero converter 332, an input multiplexer 334, a temporary register 336, a patching logic device 338, an output multiplexer 340, an output register 342, a line address register 344, a line bit counter 346, and a bitmap sequence controller 348. The line address register 244 and the line bit counter 346 operate on a line address data signal 350, and a bit offset and length data signal 352 respectively from the character mapper 118 to generate a character map address signal 354. The bitmap sequence controller 348 controls loading of a transition data word signal 356 into the Even-Odd 330 and Non-Zero 332 converters. The transition data word signal 356 consists of a series of consecutive data words along a particular scan line. Depending on the fill option selected either the Even-Odd converter 330 or the Non Zero converter 332 will operate on the transition data word signal 356 to generate an initial bitmap signal 358–360. Depending on the fill option selected, the input multiplexer selects the appropriate initial bitmap signal 358–360 to output a selected bitmap signal 362 to the output multiplexer 340 and the temporary register 336. The temporary register 336 stores the selected bitmap signal 362 (i.e. either 358 or 360) in preparation for patching. The patching logic device 338 operates on the transition data word signal 356 and the stored bitmap signal 368 to generate a logic "OR" or patched bitmap signal 364. The output multiplexer 340 selects between the selected bitmap signal 362, or the patched bitmap signal 364, to generate an output bitmap signal 366. The output bitmap signal 366 is stored in the output register 342 in preparation for reading into the character mapper 118.

Figure 25:
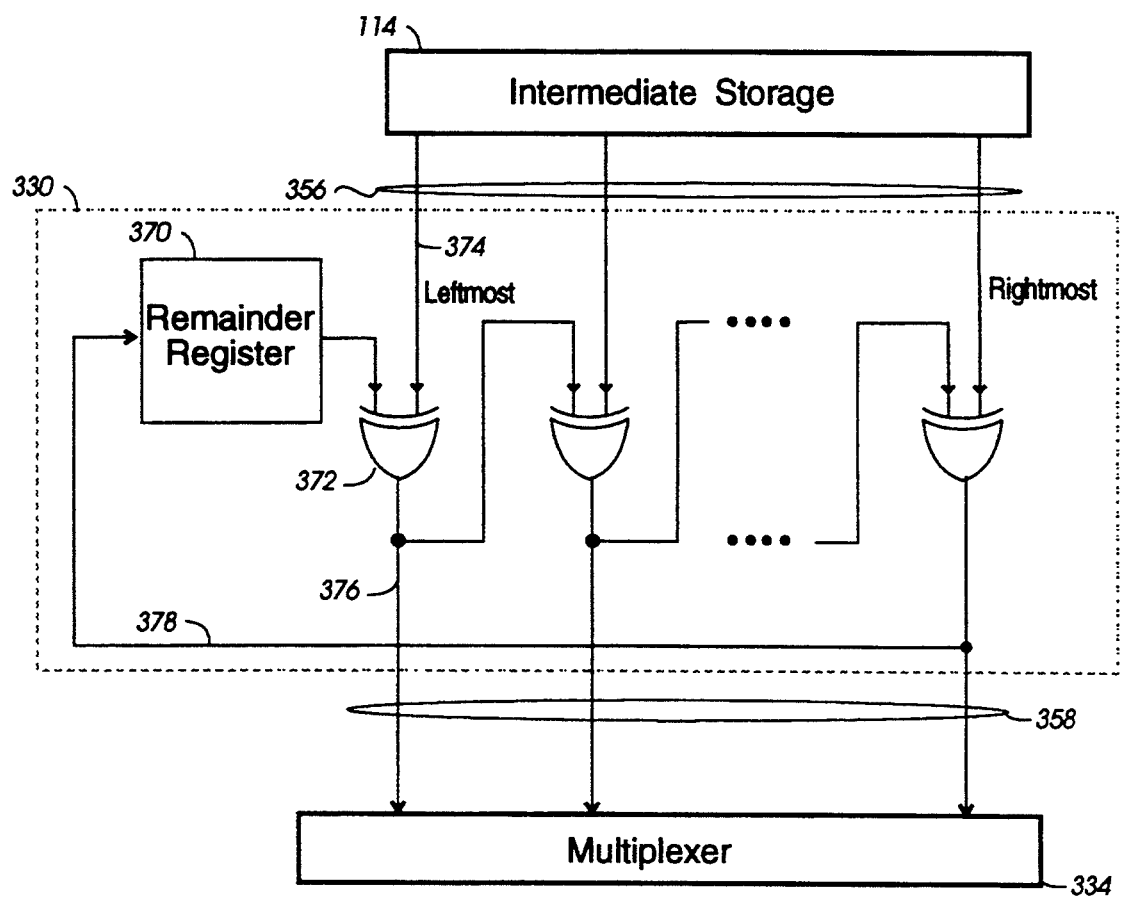
FIG. 25 is a block diagram illustrating the principal functional components of the Even-Odd converter.

The Even-Odd Converter 330 is shown in more detail in FIG. 25. Referring now to FIG. 25 it can be seen that the converter 330 consists of a remainder register 370 and a plurality of exclusive-OR gates 372. The leftmost bit 374 of the transition data word signal 356 is XORed with the contents of the remainder register 370 to produce the leftmost bit 376 of the initial bitmap signal 358. Each successive bit of the transition map is XORed with the bitmap value of its preceding bit to the end of the word. The rightmost bitmap bit 378 is then stored into the remainder register 370 as the bit to the immediate left of the first bit of a next word (assuming multiple words are required to scan a line). When starting the conversion of a new line the remainder register 370 is reset to zero.

Figure 26:
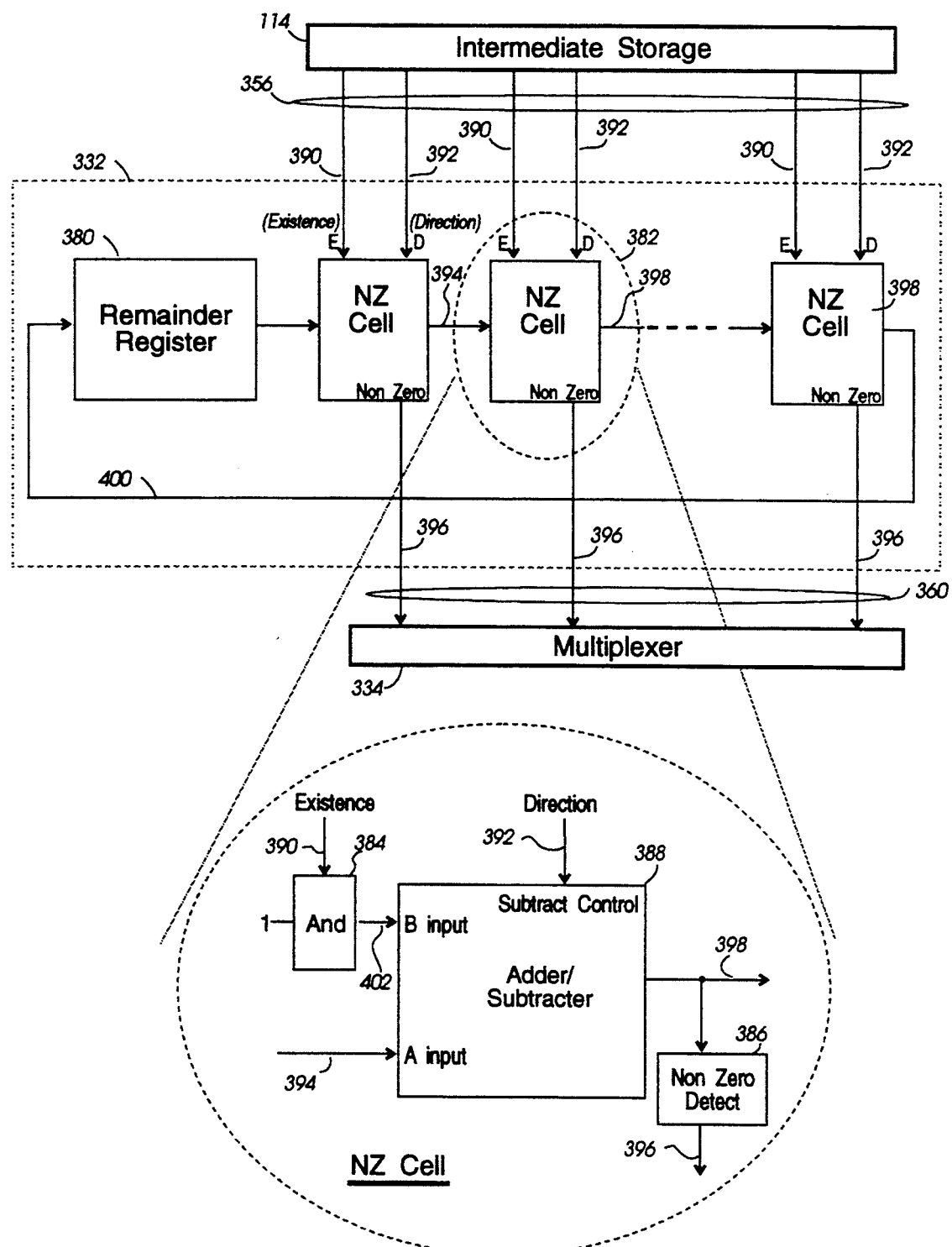
FIG. 26 is a block diagram illustrating the principal functional components of the Non-Zero converter.

The Non-Zero Winding Converter 332 is detailed in FIG. 26. Referring now to FIG. 26, the converter 332 consists of a remainder register 380, and a plurality of NZ cell devices 382. In addition, the NZ cell device 382 is made up of an adder/subtracter device 388, an "AND" gate 384, and an NZ detect device 386. In Non-Zero Winding two bits per pixel are required to generate the initial bitmap signal 360. An existence bit signal 390 and a direction bit signal 392 code the three possible transition map entries for any pixel. The remainder register 380 contains the standing count of previous words in the current scan line. The remainder register 380 is a N-bit register with "N" chosen to reflect the maximum expected imbalance of transition directions along a scan line. A "N" value equal to four can handle most characters and a "N" value equal to six should handle practically all characters, however there is no theoretical limit.

The transition data word signal 356 is brought into the NZ cell device 382 which looks at a previous pixel output count signal 394 and at the existence bit signal 390 and the direction bit signal 392 to generate an output bit signal 396 at a value of "1" if a new scan count signal 398 is at a non zero value. The new scan count signal 398 is calculated by the following rules:

if a transition does not exist, then pass the previous pixel output count signal;

if a transition exists then, if the direction value equals "0" then add one.

if the direction value equals "1" then subtract one.

Thus, in the preferred implementation, if the existence bit signal is set to "1" (i.e. a transition exists) then the "AND" gate 384 generates a "1" to an input 402 of the adder/subtractor device 388. If the direction bit signal 392 is set to "1" then the adder/subtractor device 388 subtracts the input 402 (i.e. "1") from the previous pixel output count signal 394 and outputs this difference as the new scan count signal 398. If the direction bit signal 392 is set to "0" then the adder/subtractor device 388 adds the input 402 (i.e. "1") to the previous pixel output count signal 394 and outputs this sum as the new scan count signal 398. However, if the existence bit signal is set to "0" (i.e. a transition does not exist) then the "AND" gate 384 generates a "0" to the input 402 of the adder/subtractor device 388 and outputs the previous pixel output count signal 394 as the new scan count signal 398. If the product of the word width and N is large, a carryless adder is recommended to maintain speed.

The scan count signal 400 from the rightmost pixel of the transition data word signal 356 is stored into the remainder register 380. At the start of a line the remainder register 380 is reset to zero.

The character mapper 118 takes the output bitmap signal 366 from the bitmap converter 116 and writes it line by line into the page buffer 120. In the preferred implementation, with the rasterization as a slave process, the character mapper 118 requests each line of the output bitmap signal 366 from the bitmap converter 116.

Although a preferred embodiment of the present invention has been disclosed above, it will be appreciated that numerous alterations and modifications thereof will no doubt become apparent to those skilled in the art after having read the above disclosures. It is therefore intended that the following claims be interpreted as covering all such alterations and modifications as fall within the true spirit and scope of the invention.

What is claimed is:

1. Apparatus for converting an outline font represented by a control point stream into bit mapped data suitable for driving dot matrix display devices, comprising:

point transform means responsive to said control point stream and operative to generate a transformed point stream;

flattening means responsive to said transformed point stream and operative to generate a set of normalized polysegments defined by end point data wherein the length of each polysegment has a predetermined relationship to the dimensions of a pixel to be printed or displayed;

transition detection means responsive to said normalized polysegments and operative to develop a set of flag signals and initial transition pixel data locating a transition pixel relative to each polysegment intersected by a reference line passing through a particular point of each pixel in a row of pixels, a transition pixel being defined as a pixel at which a data state transition occurs;

intermediate storage means for storing transition pixel data;

transition processing means responsive to the transition pixel data developed by said transition detection means, a plurality of process parameters, and said set of flag signals, and operative to compare said initial transition pixel data to transition pixel data previously stored in said intermediate storage means and to generate intermediate transition pixel data for return to said intermediate storage means;

bitmap converter means responsive to said stored intermediate transition pixel data, and operative to generate bitmap data; and output means responsive to said bitmap data and operative to generate output character data corresponding thereto.

2. Apparatus as recited in claim 1 wherein said flattening means includes:

parametric equation generator means responsive to said transformed point stream and operative to generate a plurality of polynomial coefficient values; and segment generation means responsive to said coefficient values and operative to generate said set of normalized polysegments.

3. Apparatus as recited in claim 2 wherein said parametric equation generator means includes:

input register means for storing a data stream including one of said transformed point stream communicated from said point transform means, and an interim value;

means for shifting said data stream stored in said input register means by a predetermined value to generate shifted data;

temporary register means for storing registered data including one of said shifted data and said interim value;

adder means for adding said shifted data with data stored in said temporary register means to generate said interim value;

equation generator sequence control means for generating a process stop signal; and output register means responsive to said process stop signal and operative to receive said interim value and store same as said coefficient value.

4. Apparatus as recited in claim 1 wherein said point transform means includes:

scaling input register means for storing a plurality of predetermined scaling factors;

control point input register means for storing a portion of said control point stream;

multiplier means for receiving said predetermined scaling factors and said portion of said control point stream, and for multiplying said predetermined scaling factor with a control point in said control point stream to generate an intermediate value stream;

adder means for adding said intermediate value stream with a previously accumulated sum value to generate said transformed point stream; and control point output register means for storing said transformed point stream.

5. Apparatus as recited in claim 1 wherein said transition processing means includes:

input register means for storing said transition pixel data said transition pixel data including X coordinate value, Y coordinate value and transition information;

tile test means responsive to said Y coordinate value and operative to compare said Y value to predetermined limit values and to generate a tile test flag value;

stub test means responsive to said Y coordinate value, and to said X coordinate value, and operative to compare said X and said Y values to previous X and Y values and to generate a stub test flag value and to store the current X and Y values;

first coordinate adder means for adding said Y coordinate value with a Y offset value;

second coordinate adder means for adding said X coordinate value with a X offset value; and sequence controller means responsive to said Y coordinate value, said X coordinate value, said tile test flag value, said stub test flag value, said set of flag signals including a Y transition flag, said process parameters and intermediate transition pixel data previously stored in said intermediate storage means, and operative to generate said Y offset value and said X offset value, read and write instructions for controlling the intermediate storage means, and to output the current intermediate transition pixel data for return to the intermediate storage means.

6. Apparatus as recited in claim 5 wherein said tile test means includes:

first limit comparator means for comparing said X coordinate value with a predetermined upper value, and operative to generate an upper limit test flag value indicating that the Y coordinate value is less than said upper value;

second limit comparator means for comparing said X coordinate value with a predetermined lower value, and operative to generate a lower test flag value indicating that the Y coordinate value is not less than said lower limit; and limit selector means responsive to said upper test flag value and said lower test flag value, and operative to generate said tile test flag value when said Y coordinate value is less than said upper limit and equal or greater than said lower limit.

7. Apparatus as recited in claim 5 wherein said stub test means includes:

a first register for storing X and Y coordinate values of the last X transition;

first comparator means for comparing current X and Y coordinate values with stored last X transitions X and Y coordinate values, and operative to generate an X stub flag value;

a second register for storing X and Y coordinate values of the last Y transition;

second comparator means for comparing current X and Y coordinate values with stored last Y transitions X and Y coordinate values, and operative to generate a Y stub flag value; and coordinate selector means responsive to said Y transition flag and operative to select said X stub flag value when said Y transition flag is of a first state and to load current X and Y coordinates into said first register, and to select said Y stub flag value when said Y transition flag is of a second state and to load current X and Y coordinates into said second register.

8. Apparatus as recited in claim 1 wherein said bitmap converter means includes:

even odd converter means responsive to said stored intermediate transition pixel data, and operative to generate an even odd bitmap data stream;

non-zero converter means responsive to said stored intermediate transition pixel data, and operative to generate a non-zero bitmap data stream;

first selection means responsive to a first bitmap select signal operative to select one of said even odd bitmap data stream and said non-zero bitmap data stream for use as an interim bitmap data stream;

temporary register means for storing said interim bitmap data stream;

patching logic means responsive to said interim bitmap data stream and said stored intermediate transition pixel data, and operative to generate a patched bitmap data stream;

second selection means responsive to a second bitmap select signal operative to select one of said patched bitmap data stream and said interim bitmap data stream for use as bitmap data;

bitmap register means for storing said bitmap data; and bitmap control means responsive to said stored intermediate transition pixel data to generate said first bitmap select signal, and said second bitmap select signal.

9. Apparatus as recited in claim 8 wherein said non zero converter means having:

adder/subtracter means responsive to said stored transition word, and a count signal, and operative to generate a new count signal, and said non-zero bitmap data stream;

non-zero remainder means responsive to said new count signal and operative to generate said count signal.

10. A method of converting an outline font represented by a control point stream into bit mapped data suitable for driving dot matrix display devices, comprising the steps of:

converting said control point stream into a transformed point stream;

using said transformed point stream to generate a set of normalized polysegments wherein the length of each polysegment has a predetermined relationship to the dimensions of a pixel to be printed or displayed;

using said normalized polysegments to develop initial transition pixel data including transition address information and flag signals locating a transition pixel relative to each polysegment intersected by a reference line passing through a particular point of each pixel in a row of pixels, a transition pixel being defined as a pixel at which a data state transition occurs;

using a plurality of process parameters to compare said initial transition pixel data to previously stored corresponding transition pixel data to generate intermediate transition pixel data;

storing said intermediate transition pixel data;

using said stored intermediate transition pixel data to generate bitmap data; and using said bitmap data to generate output character data corresponding thereto.

11. A method as recited in claim 10, wherein said step of converting said control point stream includes the steps of:

storing a plurality of predetermined scaling factors;

storing a portion of said control point stream;

multiplying said predetermined scaling factors with coordinates of a control point in said control point stream, to generate an intermediate value stream;

adding said intermediate value stream to a previously accumulated sum value to produce said transformed point steam; and storing said transformed point stream.

12. A method as recited in claim 10, wherein said step of using said transformed point stream includes the steps of:
   using said transformed point stream to generate a plurality of polynomial coefficient values; and
   using said coefficient values to generate said set of normalized polysegments.

13. A method as recited in claim 10 wherein said step of using said stored intermediate transition pixel data includes the steps of:
   reading said stored intermediate transition pixel data;
   converting said stored intermediate transition pixel data to an even odd bitmap data stream;
   converting said stored intermediate transition pixel data to a non-zero bitmap data stream;
   selecting one of said even odd bitmap data stream and said non-zero bitmap data stream, for use as an interim bitmap data stream;
   storing said interim bitmap data stream;
   patching said interim bitmap data stream with said stored intermediate transition pixel data to generate a patched bitmap data stream;
   selecting one of said patched bitmap data stream and said interim bitmap data stream, for use as bitmap data; and
   storing said bitmap data.

14. A method as recited in claim 10 wherein said step of using said transition pixel data includes the steps of:
   (a) reading said transition pixel data, wherein said transition pixel data includes a current slope value corresponding to the slope of a polysegment generating said transition pixel data, a current transition bit signal, and a current transition address signal;
   (b) reading said stored transition word, wherein said stored transition word includes a previous slope value corresponding to the slope of a polysegment generating said transition word, a previous transition bit signal, and a previous transition address signal;
   (c) reading said process parameters, wherein said process parameters are made up of a dropout protection signal, a non-zero processing signal, and a vertical scan signal;
   (d) comparing said transition pixel data with said stored transition word;
   (e) determining if said dropout protection signal is set to a second flag signal and said non-zero processing signal is set to a second flag signal then generating said final transition pixel data wherein said final transition pixel data includes a final transition bit signal, a current slope value corresponding to the slope of a polysegment generating said final transition pixel data, and a final transition address signal, and wherein said final transition address signal is equal to said current transition address signal of said transition pixel data;
   (f) determining if said dropout protection signal is set to said second flag signal and said non-zero processing signal is set to a first flag signal then
      (1) determining if said current transition bit signal is equal to said previous transition bit signal then
         (a) if said current slope value and said previous slope value are not identical then generating said final transition bit signal to a "0",
         (b) if said current slope and said previous slope value are identical then setting said final transition address signal to previous transition address signal and setting said previous transition address signal to a predetermined bias value,
      (2) determining if said current transition bit signal is not equal to said previous transition bit signal then generating said final transition pixel wherein said final transition address signal is equal to said current transition address signal of said transition pixel data;
   (g) determining if said dropout protection signal is set to said first flag signal and said non-zero processing signal is set to said second flag signal then
      (1) determining if said current transition bit signal is equal to said previous transition bit signal then setting said final transition address signal to previous transition address signal and setting said previous transition address signal to a predetermined bias value,
      (2) determining if said current bit signal is not equal to said previous transition bit signal then generating said final transition pixel data wherein said final transition address signal is equal to said current address signal of said transition pixel data; and
   (h) determining if said dropout protection signal and said non-zero processing signal are both set to said first flag signal then
      (1) determining if said vertical scan signal is set to said first signal flag then setting said final transition address signal to previous transition address signal and setting said previous transition address signal to a predetermined bias value,
      (2) determining if said vertical scan signal is set to said second signal flag then
         (a) if said current slope value and said previous slope value are not identical then generating said final transition bit signal to a "0",
         (b) if said current slope and said previous slope value are identical then setting said final transition address signal to previous transition address signal and setting said previous transition address signal to a predetermined bias value.

15. A method as recited in claim 10 wherein said step of comparing said initial transition pixel data to said previously stored corresponding transition pixel data includes the steps of:
   (a) reading said transition pixel data, including X coordinate value, Y coordinate value and transition information;
   (b) comparing said Y value to predetermined limit values and to generate a tile test flag value;
   (c) comparing said X and said Y values to previous X and Y values and to generate a stub test flag value;
   (d) storing the current X and Y values;
   (e) adding said Y coordinate value with a Y offset value;
   (f) adding said X coordinate value with a X offset value; and
   (g) using said Y coordinate value, said X coordinate value, said tile test flag value, said stub test flag value, said set of transition flags including a Y transition flag, said process parameters and intermediate transition pixel data previously stored in said intermediate storage means, to generate said Y offset value and said X offset value, read and write instructions for controlling the intermediate storage means, and for outputting the current intermediate transition pixel data for return to the intermediate storage means.

16. A method as recited in claim 15 wherein said steps of generating said tile test flag value includes the steps of:
 (a) comparing said Y coordinate value with a predetermined upper value, to generate an upper limit test flag value indicating that the Y coordinate value is less than said upper value;
 (b) comparing said Y coordinate value with a predetermined lower value, to generate a lower test flag value indicating that the Y coordinate value is not less than said lower limit; and
 (c) using said upper test flag value and said lower test flag value, to generate said tile test flag value when said Y coordinate value is less than said upper limit and equal or greater than said lower limit.

17. A method as recited in claim 15 wherein the step of generating said stub test flag includes the steps of:
 (a) storing X and Y coordinate values of the last X transition into a first register;
 (b) comparing current X and Y coordinate values with stored last X transitions X and Y coordinate values, to generate an X stub flag value;
 (c) storing X and Y coordinate values of the last Y transition into a second register;
 (d) comparing current X and Y coordinate values with stored last Y transitions X and Y coordinate values, to generate a Y stub flag value; and
 (e) using said Y transition flag to select said X stub flag value when said Y transition flag is of a first state and to load current X and Y coordinates into said first register, and to select said Y stub flag value when said Y transition flag is of a second state and to load current X and Y coordinates into said second register.

* * * * *